US012567095B2

(12) United States Patent
Mokashi et al.

(10) Patent No.: US 12,567,095 B2
(45) Date of Patent: Mar. 3, 2026

(54) TRANSACTION PROCESSING AT EDGE SERVERS IN A CONTENT DISTRIBUTION NETWORK

(71) Applicant: Amazon Technologies, Inc., Seattle, WA (US)

(72) Inventors: Ronil Sudhir Mokashi, Mercer Island, WA (US); Prashant Verma, Seattle, WA (US); Karthik Uthaman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 362 days.

(21) Appl. No.: 18/048,713

(22) Filed: Oct. 21, 2022

(65) Prior Publication Data

US 2023/0104676 A1 Apr. 6, 2023

Related U.S. Application Data

(63) Continuation of application No. 16/370,623, filed on Mar. 29, 2019, now Pat. No. 11,481,825.

(51) Int. Cl.
G06Q 30/00 (2023.01)
G06Q 30/0601 (2023.01)
(Continued)

(52) U.S. Cl.
CPC ..... *G06Q 30/0613* (2013.01); *G06Q 30/0637* (2013.01); *H04L 67/1004* (2013.01); *H04L 67/568* (2022.05)

(58) Field of Classification Search
CPC .............. G06Q 30/00; G06Q 30/0613; G06Q 30/0637; H04L 67/1004; H04L 67/568
See application file for complete search history.

(56) References Cited

U.S. PATENT DOCUMENTS 6,606,645 B1 * 8/2003 Cohen ..................... H04L 67/14
709/203
7,149,797 B1 12/2006 Weller et al.
(Continued)

OTHER PUBLICATIONS

Tran, Tina, "Dynamic Whole Site Delivery with Amazon CloudFront", Amazon Network and Content Delivery, Dated Dec. 19, 2017. (Year: 2017).*

(Continued)

*Primary Examiner* — Anne M Georgalas
(74) *Attorney, Agent, or Firm* — Robert C. Kowert; Kowert, Hood, Munyon, Rankin & Goetzel, P.C.

(57) ABSTRACT

Various embodiments of apparatuses and methods for transaction processing at edge servers in a content distribution network ("CDN") are described. In some embodiments, an edge server receives an initial request from a client for content associated with a particular origin, and then provides the content to the client. The edge server can then receive another request from the client that might include an indicator for transaction processing. The edge server determines that transaction processing is indicated for handling this new request, in some embodiments. The edge server can then send a transaction notification to the origin, receive a transaction continuation response from the origin, and then execute a data transaction with transaction entities that are distinct from the content distribution network and the origin, in some embodiments. If the transaction is successful, the edge server can notify the client and the origin of the successful transaction, in some embodiments.

20 Claims, 10 Drawing Sheets

(51) Int. Cl.
    *H04L 67/1004*     (2022.01)
    *H04L 67/568*     (2022.01)

(56)           References Cited

U.S. PATENT DOCUMENTS

| | | | |
|---|---|---|---|
| 7,343,619 B2 | 3/2008 | Ofek et al. | |
| 7,672,873 B2 | 3/2010 | Kindig et al. | |
| 7,707,314 B2 | 4/2010 | McCarthy et al. | |
| 7,711,647 B2 * | 5/2010 | Gunaseelan | G06Q 10/10 |
| | | | 713/161 |
| 7,925,973 B2 | 4/2011 | Allaire et al. | |
| 8,468,247 B1 | 6/2013 | Richardson et al. | |
| 8,799,674 B1 * | 8/2014 | Leighton | G06Q 30/0635 |
| | | | 713/189 |
| 8,909,735 B2 | 12/2014 | Swildens et al. | |
| 8,914,814 B1 | 12/2014 | Middleton et al. | |
| 9,391,949 B1 | 7/2016 | Richardson et al. | |
| 9,438,444 B1 | 9/2016 | Middleton et al. | |
| 9,852,416 B2 | 12/2017 | Mahaffey et al. | |
| 9,942,363 B2 | 4/2018 | Stevens et al. | |
| 10,353,910 B2 * | 7/2019 | Robison | H04L 43/0876 |
| 11,240,195 B2 * | 2/2022 | Dayan | H04L 51/58 |
| 2002/0059428 A1 * | 5/2002 | Susai | H04L 67/1008 |
| | | | 709/227 |
| 2002/0143888 A1 * | 10/2002 | Lisiecki | H04L 67/1095 |
| | | | 709/217 |
| 2005/0120107 A1 | 6/2005 | Kagan et al. | |
| 2008/0228923 A1 * | 9/2008 | Chidambaran | H04L 67/56 |
| | | | 709/227 |
| 2011/0126018 A1 | 5/2011 | Narsinh et al. | |
| 2013/0046664 A1 | 2/2013 | Kazerani et al. | |
| 2013/0046883 A1 | 2/2013 | Lientz et al. | |
| 2013/0291036 A1 | 10/2013 | Yamagishi | |
| 2014/0229525 A1 * | 8/2014 | Crawford | H04L 65/1066 |
| | | | 709/203 |
| 2014/0237067 A1 * | 8/2014 | Todd | H04L 43/0882 |
| | | | 709/213 |
| 2014/0245347 A1 | 8/2014 | Anderson et al. | |
| 2014/0337238 A1 | 11/2014 | Leighton | |
| 2015/0026239 A1 | 1/2015 | Hofmann et al. | |
| 2015/0106164 A1 | 4/2015 | Thibeault et al. | |
| 2015/0302481 A1 | 10/2015 | Callahan | |
| 2016/0182401 A1 * | 6/2016 | Dick | H04L 47/803 |
| | | | 709/226 |
| 2017/0013012 A1 | 1/2017 | Hansen | |
| 2017/0277909 A1 | 9/2017 | Kraemer et al. | |

OTHER PUBLICATIONS

"MasterCard Empowering Banks to Expand Their Reach around the World; Announces Integration of all Authorization Transactions on a Single, Global Platform", Business Wire, Jul. 13, 2006 (Year: 2006).*

"Beyond CDN: Content Processing at the Edge of the Cloud," by Selekul Islam and Jean-Charles Gregoire, Advanced Content Delivery, Streaming and Cloud Services, First Edition, Edited by Mukaddim Pathan, Ramesh K. Sitaraman, and Dom Robinson, John Wiley & Sons, Inc, 2014 (Year: 2014).*

"Drafting Behind Akamai: Inferring Network Conditions Based on CDN Redirections," by Ao-Jan Su, David R. Choffnes, Aleksandar Kuzmanovic, and Fabian E Bustmanate, IEEE/ACM Transactions on Networking, vol. 17, No. 6, Dec. 2009 (Year: 2009).*

Bumgardner, Cody et al., Making Sence or Edge Computing, Manning Publications, Dated Jun. 28, 2007 (Year: 2007).

Moore, Nathan, "Cut media workload latency and costs with edge computing", Stackpath, Dated Feb. 3, 2019. (Year: 2019).

CMS, Edge server operation and maintenance Manual (O&MM), Version 2.0, Center for Medicare and Medicaid Services, dated Jun. 8, 2018. (Year: 2018).

Liu, Mengting, "Distributed Resource Allocation in Blockchain-Based Video Streaming Systems With Mobile Edge Computing", IEEE transactions on wireless communications, vol. 18. No 1, dated Jan. 2019 (Year: 2019).

* cited by examiner

TRANSACTION PROCESSING AT EDGE SERVERS IN A CONTENT DISTRIBUTION NETWORK

This application is a continuation of U.S. patent application Ser. No. 16/370,623, filed Mar. 29, 2019, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

In addition, the ubiquity of high-speed Internet access has paved the way for alternatives to traditional broadcast media (e.g., "over-the-air" broadcast, wired cable television, and satellite broadcast). For instance, to augment or replace broadcast media, consumers can rent, purchase, and/or subscribe to electronic content delivered over the Internet. As conventional broadcast media has generally employed mature technologies capable of providing seamless playback of content, consumers have grown to expect a high level of quality from the content viewing experience. From the content consumer's standpoint, the fact that streaming media is a relatively new technology in comparison to conventional broadcast media is no excuse for poor playback performance, such as playback interruption, rebuffering, and/or video quality degradation.

Networks for delivering streaming content to users over the Internet can be large, complex, and capital intensive to deploy and maintain. In some cases, merchants that offer electronic content over the Internet will enlist the services of a third party network provider. For instance, the merchant may have the proper rights or licenses to sell or rent content while opting to offload the actual content delivery to a third party. These third parties often include content delivery network (or content distribution network) ("CDN") providers. In these types of arrangements, the merchant may handle the business logic for selling or renting content to a customer while the CDN provider handles the delivery of streaming content to the customer's playback device.

These content delivery networks or content distribution networks may employ distributed systems across different geographical locations to deliver content to end users in an efficient manner. A CDN may provide various types of content such as web pages and their constituent elements, streaming media, downloadable media, application data, and so on. The goals of a CDN may include high availability and low latency for delivery of content. The distributed system that implements a CDN may include remote points of presence in many geographical locations, often over multiple backbones, so that content can be served to disparate users with high performance. These remote points of presence may be termed edge locations.

Figure 1:
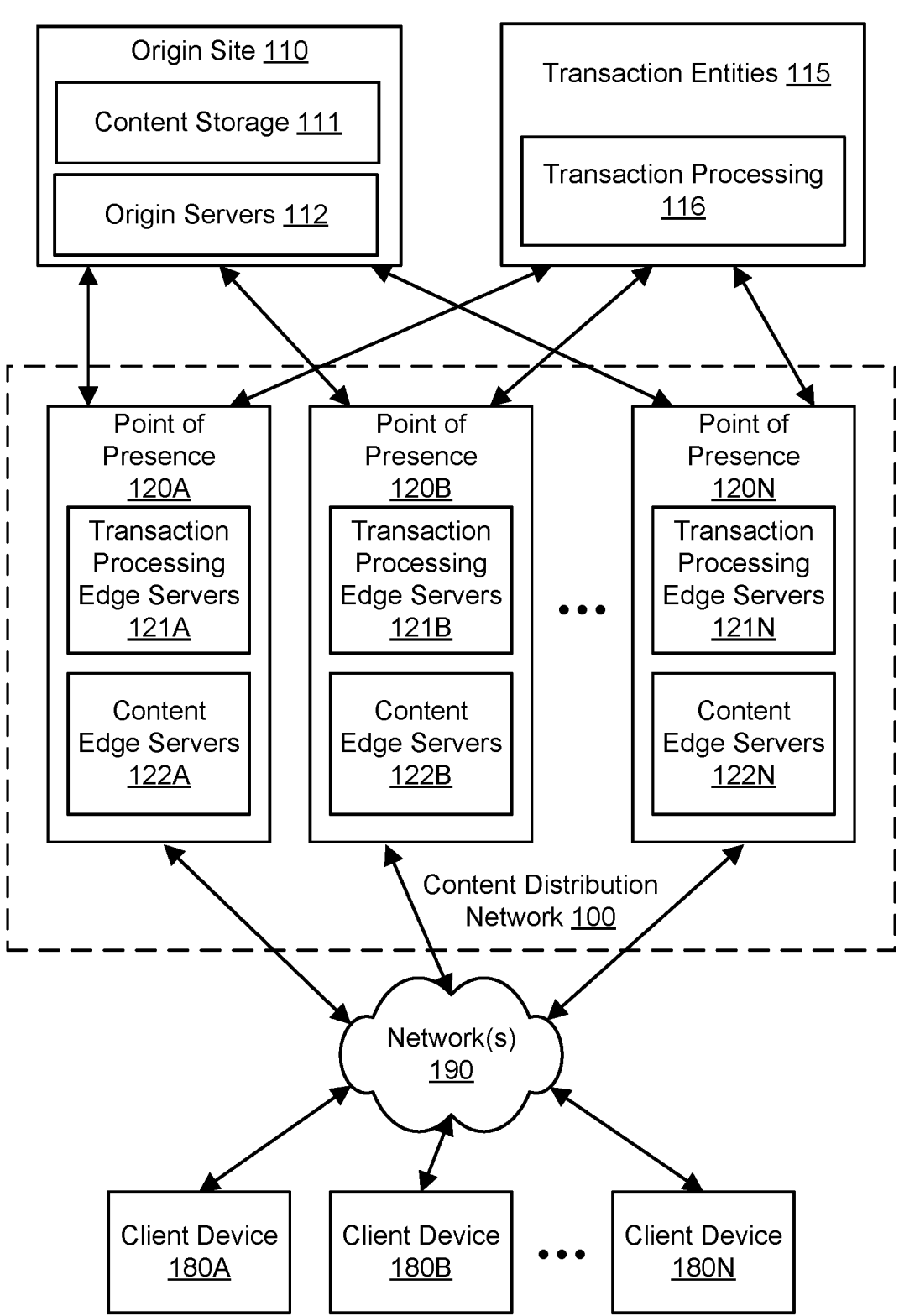
FIG. 1 illustrates an example system environment for transaction processing at edge servers in a content distribution network that comprises points of presence in a content distribution network communicating with a plurality of clients, an origin server site, and transaction entities, where the points of presence comprise transaction processing edge servers and content edge servers, according to some embodiments.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of methods, systems, and computer-readable media for transaction processing at edge servers in a content distribution network ("CDN") are described. In some traditional systems, end users, such as clients, would have to communicate directly with an origin for transaction processing. This creates additional calls to the origin that usually have a high latency. In addition, clients being forced to communicate with the origin for transaction processing might overload either the origin or the communication networks to the origin. Origins can have a hard time handling peak transaction periods.

More specifically, to initiate a transaction in some traditional systems, the client can communicate with a CDN using a secure communications protocol such as Secure Sockets Layer ("SSL") or Transport Layer Security ("TLS"). A server of the CDN can perform an SSL or TLS termination of a connection with the client. As part of this communication protocol, there might be a handshake and a certificate exchange where the client authenticates the CDN servers, and the CDN servers provide a certificate for the merchant's website, which the client will verify. This communication protocol can establish a connection, such as an SSL or TLS connection between the client and a server of the CDN. Transaction processing can be initiated by the CDN server receiving a request from a client, such as a POST request from a URL encoded webpage, for example. The POST request might contain some details regarding the transaction, such as an identification of the merchant and a quantity of items to be transacted. The CDN server might then act as a proxy, and establish a connection to the appropriate merchant's origin site, for example, or use an already established connection, and forward the POST request to the origin.

The origin, in these traditional systems, can receive requests that were forwarded from CDN servers. The origin might receive many requests from many clients, and from many CDN servers, in a short amount of time. The origin might have to scale up to process all the requests being received from all the different clients. The origin can then process each of these requests. As part of this processing, the origin might establish a connection with third party transaction entities. In a payment processing context, for example, these third-party transaction entities can be credit card servers of major credit card companies. The origin will then communicate with the external transaction entity to determine if the transaction is successful or not. If the transaction is successful, the origin might notify the client of the successful transaction, either directly or through the CDN server that has an established connection with the client.

With some embodiments of the current invention, however, transaction processing can happen at edge servers. This can reduce the number of backend calls, in some embodiments. In addition, end users can finish with a transaction before the origin realizes that an order has been placed, in some embodiments. This reduces the perceived latency of the overall transaction as seen by the end user, in some of these embodiments. In addition, in some embodiments, the origin is relieved from having to communicate with transaction processing sites. Instead, the CDN can have dedicated high-speed connections to the transaction sites for all the customers of the CDN, reducing an end user's latency in processing a transaction. In addition, because the CDN might have dedicated hot connections to transaction entities, in some embodiments, if the origin has a spike in traffic, edge servers might process more orders more reliably for a wide variety of different origins during high-traffic periods, for example.

In some embodiments, a point of presence of a CDN, including edge servers at the point of presence, can implement transaction processing. CDNs can have a multi-layered cache hierarchy. For example, CDNs can have at least two levels of cache, an L1 point-of-presence that interfaces directly with a client, and an L2 cache, which acts as mid-tier cache between multiple points of presence ("PoPs") in a particular region, and the server with the original content, (a.k.a. an origin server). In some embodiments, an edge server associated with a point of presence can receive an initial request from a client for content associated with a particular origin, and then can provide the content to the client. The edge server can communicate to the client using a secure communications protocol such as Secure Sockets Layer ("SSL") or Transport Layer Security ("TLS"). As part of this communication protocol, there might be a handshake and a certificate exchange where the client authenticates a PoP's edge server, and the PoP's edge servers provide a certificate for the merchant's website, which the client will verify. This communication protocol can establish a connection, such as an SSL or TLS connection between the client and a server of the CDN. The edge server can, therefore, perform an SSL or TLS termination of this connection with the client.

After, the origin receives an initial request for content from a client, the content can be provided from either a content cache at the edge server's point of presence, or through a request to an upstream layer of the cache. This request to upstream layers of the cache might eventually be sent to the origin itself. The response to the request will then be forwarded through all the requesting cache layers until it eventually reaches the initial requesting edge server, who will in turn provide the requested content to the requesting client. Any upstream layer of the CDN which possesses the content in its own local cache might respond to the request with the requested content, instead of forwarding the request to a further upstream layer, or forwarding the request to the origin. If no layers of the CDN comprise the requested content, or if the requested content is out of date or too old at the CDN layers, then the request might be sent through those CDN layers to the origin to be fulfilled.

The edge server can eventually provide the requested content to the client. This requested content might comprise an indicator for transaction processing in some part of the requested content. For example, in the payment processing content, this indicator might be associated with a "Buy" button included in a webpage that is sent to the client, in some embodiments. In other embodiments, the indicator for transaction processing might be associated with a "Watch Now" button in a streaming service's catalog of content. In other embodiments, the indicator might be associated with other content. The end user might interact with the received content in such a way to send another request to the edge server. An end user might generate a POST request from a URL encoded webpage, for example. This POST request might contain some details regarding a transaction, such as an identification of the merchant and a quantity of items to be transacted. For example, the end user might click on the "Buy" or "Watch Now" buttons, in some embodiments, to generate this request. The edge server then receives this other request, such as a POST request, from the client that might include this indicator for transaction processing.

The edge server can then determine that transaction processing is indicated for handling this new request from the client, such as the POST request, in some embodiments. The edge server might detect the indicator for transaction processing as part of the new request, in some embodiments. However, there are other ways the edge server might determine that transaction processing is indicated for handling a new request besides detection of an indicator for transaction processing. Other properties of the request might be used, for example, and the indicator for transaction processing is only one embodiment.

After determining that transaction processing is indicated for handling this new request, the edge server can then send a transaction notification to an origin, in some embodiments, such as the origin associated with the identified merchant in the POST request, for example. This transaction notification might include a customer identification, a product number, and a quantity being requested, in some embodiments. In other embodiments, the transaction notification might include other information relevant to the context of the transaction. An origin server at the origin can receive this transaction notification and can determine whether the transaction can proceed, in some embodiments. If the origin determines that the transaction can proceed, the origin can then send a transaction continuation response to the edge server.

The edge server can receive this transaction continuation response from the origin, and then execute a data transaction with transaction entities that are distinct from the content distribution network and the origin, in some embodiments. The type and functionality of these transaction entities will be dependent on the context of the transaction being transacted. The edge server, or the point of presence associated with the edge server, might maintain a pool of open connections with one or more of these transaction entities, and one of these open connections can used to execute the data transaction, in some embodiments. This pool of open connections might be secure connections, such as TLS connections, with two-way authentication, in some embodiments. In other embodiments, the edge server or the associated PoP, might establish a new connection with one or more transaction entities, or might otherwise communicate with one or more transaction entities without an established connection. The edge servers, or the associated PoP, can also locally store information needed to process the transaction locally. This information can be communicated to the one or more transaction entities in a communication to execute the data transaction. If the transaction is successful, the edge server can notify the client and/or the origin of the successful transaction, in some embodiments. In other embodiments, the edge server might only notify the origin that the transaction is successful, and then the origin might in turn notify the client that the transaction is successful. This communication between the origin and the client might occur through the CDN, including through the edge server, in some embodiments.

In some embodiments, a use case for the transaction processing at the edge servers could be a payment processing system. In some of these embodiments, a customer of a CDN, such as an online retailer, might provide an indication for transaction processing in their webpages. In some embodiments, these can be via tags such as *<tag type: CDN-payment>*. In these embodiments, when this tag is included in a request from the end-user, for example when the end-user click on a "Buy it now" button, then this tag tells the point of presence that the transaction processing associated with this request is to be handled by the edge server's transaction processing. In the payment processing context, this transaction processing can be a payment processor at the edge server. In the video streaming context, this transaction processing can be a determination of whether the user is allowed to view the video content at the edge server, for example.

When an edge server determines that transaction processing is indicated for handling the request, then it analyzes the request from the client to determine the appropriate details of the transaction, in some embodiments. At this point, the point of presence of the CDN, such as transaction processing edge servers, communicates to the origin site and asks to reserve a quantity with a visibility timeout. If the origin site doesn't hear back from the appropriate edge servers within some time with a confirmation, then the transaction might be cancelled, and the quantity might become available for purchase again, in some embodiments.

The edge servers pass to the origin site whatever parameters are needed to determine if the items are available. For example, in the payment processing context, the edge servers can send the origin the following parameter: "Seller: MerchantX", "Item: ProductY", "Quantity: 2". The origin site corresponding to MerchantX might then respond with an indication of "yes. Proceed with payment." Then the edge servers at the point of presence of the CDN might handle the payment. The edge servers provide security. The edge servers can also locally store information needed to process the transaction locally at the point of presence. As an example, in the payment processing context, the point of presence might include a credit card database of a merchant's customer's credit card numbers to use for payment processing. For example, if a customer has already purchased something with the merchant in the last year, then their credit card details might be available in storage at the point of presence. Therefore, payment is faster and handled by the edge servers of the content distribution network. If a client's transaction details are not available at the edge, the then edge servers query the merchant's origin site to get updated details, which in the payment processing context can be customer credit card details.

Embodiments of a Transaction Processing at Edge Servers

FIG. 1 illustrates an example system environment for transaction processing at edge servers in a content distribution network that comprises points of presence 120A-120N in a content distribution network 100 communicating with a plurality of clients 180A-180N, an origin server site 110, and transaction entities 115, where the points of presence comprise transaction processing edge servers 121A-121N and content edge servers 122A-122N, according to some embodiments.

Embodiments of a content distribution network 100 are described that may be implemented on or by a provider network, in some embodiments, that communicates with the plurality of clients 180A-180N. In other embodiments a content distribution network 100 may be implemented in enterprise networks or simple client-server networks, or any kind of network where a computer accesses a resource through a network. The content distribution network 100 may be operated by an entity to provide one or more services, such as various types of content distribution services, accessible via the Internet and/or other networks to client(s) 180A-180N. The content distribution network 100 may include numerous data centers hosting various resource pools, such as collections of physical and/or virtualized computer servers, storage devices, networking equipment and the like, needed to implement and distribute the infrastructure and services offered by the content distribution network 100. In some embodiments the content distribution network 100 may employ computing resources for its provided services.

The client(s) 180A-180N may encompass any type of client configurable to submit requests to the content distribution network 100. For example, a given client 180A-180N may include a suitable version of a web browser or may include a plug-in module or other type of code module configured to execute as an extension to or within an execution environment provided by a web browser. Alternatively, a client 180A-180N may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 180A-180N may be configured to generate network-based services requests according to a Representational State Transfer (REST)-style network-based services architecture, a document-based or message-based or network-based services architecture, or another suitable network-based services architecture. In some embodiments, the content distribution network 100 may offer its services as web services, and the client(s) 180A-180N may invoke the web services via published interfaces for the web services. In some embodiments, a client 180A-180N (e.g., a computational client) may be configured to provide access to the content distribution network 100 in a manner that is transparent to applications implemented on the client(s) 180A-180N utilizing content distribution resources provided by the content distribution network 100.

The client(s) 180A-180N may convey network-based services requests to the content distribution network 100 via network connections, such as a large-scale network 190, which, in some embodiments, can be the Internet. In various embodiments, network connections may encompass any suitable combination of networking hardware and protocols necessary to establish network-based communications between clients 180A-180N and the content distribution network 100. For example, a network connection may generally encompass the various telecommunications networks and service providers that collectively implement the Internet. A network connection may also include private networks such as local area networks (LANs) or wide area networks (WANs) as well as public or private wireless networks. For example, both a client 180A-180N and the content distribution network 100 may be respectively provisioned within enterprises having their own internal networks. In such embodiments, the network connection may include the hardware (e.g., modems, routers, switches, load balancers, proxy servers, etc.) and software (e.g., protocol stacks, accounting software, firewall/security software, etc.) necessary to establish a networking link between the client 180A-180N and the Internet as well as between the Internet and the content distribution network 100. In some embodiments, client(s) 180A-180N may communicate with the content distribution network 100 using a private network rather than the public Internet.

In the illustrated embodiment, clients 180A-180N may request electronic content from a merchant that owns the content located on the origin servers 112 of the origin server site 110. The merchant might also own and/or operate the origin servers 112 of the origin server site 110. The origin servers(s) 112 may persistently store elements of content in content storage 111 and may also generate content dynamically, e.g., based on elements of content in the content storage 111. Examples of electronic content may include but are not limited to electronic representations of movies, music, and television programming. In one example, the merchant may sell or rent electronic content to clients through a commerce interface, such as a web portal configured to offer an electronic catalog of items as well as logic for accepting payment for items of such catalog.

A client 180A-180N can communicate with a merchant system to carry out carry out transactions for electronic content. Merchant system(s) may include systems configured to implement such a commerce interface. Clients 180A-180N may carry out transactions for electronic content with merchant system over one or more networks 190 that are configured to transport electronic representations of data or information.

In various embodiments, the merchant system(s) may rely on the content distribution network 100 for the actual delivery of content to client systems 180A-180N. For instance, content distribution network 100 may store electronic content that the merchant offers for sale to clients. The content sources may charge the merchant a fee for delivery of such content to the clients. The CDN 100 may also provide various types of content such as web pages and their constituent elements, streaming media, downloadable media, application data, program code intended for execution at client devices, and so on.

Clients 180A-180N may be implemented by one or more computers or electronic devices configured to receive (e.g., download) and playback electronic content from the content distribution network 100. In various embodiments, clients 180A-180N may also include reporting logic configured to report quality metrics associated with content sources to merchant systems. For instance, when a given client system 180A-180N is engaged in a streaming content session with the content distribution network 100, the client system may record quality metrics associated with that session and send such metrics to merchant system(s). In various embodiments, different clients of clients 180A-180N may perform similar reporting actions. Merchant systems may store the metrics for multiple sessions within data store and use such metrics to generate rankings of content sources. A given ranking may rank content sources based on an expected measure of quality for a content stream between one of the content sources and one of the clients. In various embodiments, the merchant system(s) may generate a given ranking such that the cost of content delivery (e.g., the cost that content sources charge the merchant for delivering content to the clients) influences the rank of content sources.

In the illustrated embodiment, the content distribution network 100 may be implemented by one or more points of presence 120A-120N that include content edge servers 122A-122N that are configured to provide (e.g., stream or transfer) data to clients 180A-180N. The points of presence 120A-120N may also cache elements of content originally obtained from the origin server(s) 110. Accordingly, each of the points of presence 120A-120N or content edge servers 122A-122N, may include a content cache. In various embodiments, a given CDN may include one or more servers, routers, caches, and other components in order to provide content to multiple geographically-dispersed clients. In various embodiments, any given component of the content distribution network 100 may be implemented on one or more computers, such as that of FIG. 10 described below.

The origin server(s) 110 may be more centrally located (e.g., within particular regions) than the edge servers (121A-121N and 122A-122N) that comprise the points of presence 120A-120N. As used herein, the term "edge server" generally refers to a content server at an edge location, and the term "edge location" generally refers to a location (in terms of geography and/or network topology) that is closer to end users according to some metric. As used herein, the term "origin server" generally refers to a content server that supplies content to one or more edge servers. The points of presence 120A-120N may be distributed in a variety of geographical locations or locations in a network topology that may be termed edge locations. The points of presence 120A-120N may be positioned in disparate locations so that they can provide content to client devices 180A-180N in various locations with generally higher performance than the origin server(s) 110. In one embodiment, the higher performance of content delivery using the points of presence 120A-120N may be measured in terms of network latency, network bandwidth usage, page load times, and/or any other suitable metric(s). For example, for a particular request for content, a particular client device may be routed to a particular edge server in a manner than minimizes network latency or otherwise maximizes performance, such as by reducing a number of network hops between the client device and the selected edge server. The use of the points of presence 120A-120N to deliver content may also provide higher availability and/or lower cost.

In various embodiments, the origin server site 110 may include one or more computers or other electronic devices configured to perform the functionality described herein. In various embodiments, the origin server site 110 may be implemented on one or more computers, such as that of FIG. 10 described below. Likewise, clients 180A-180N may each be implemented as one or more computers or other electronic devices configured to perform the functionality described herein. Examples of clients may include any computer or electronic device configured to playback (or "play") streamed content received from a remote entity. In various embodiments, such clients may include one or more buffers in which to store portions of such streamed content. For instance, a client may play content retrieved from its buffer such that nominal network variations or latencies do not affect the playback of the content. In some cases, a given client may fill its content buffer with data and then begin playback of the data from that buffer. Buffer sizes may be configurable to promote uninterrupted playback of content.

The system in FIG. 1 might also include a router or load balancer, which can be network appliance which performs a network connection termination function in order to provide an endpoint for the network connection from the clients, in some embodiments. In FIG. 1, there can be network connections shown from each of the clients to the router or load balancer. The router or load balancer might route packets to and from the plurality of the points of presence 120A-120N of the content distribution network 100.

The system can also include network interfaces, tunnel network interfaces, and stream sockets. A network interface can be a device which sends packets to the network and receive packets from the network, in some embodiments. Network interfaces can be attached to either the potential router or load balancer, or the content distribution network 100. If a network interface is attached to the router or load balancer or the content distribution network 100, then the router or load balancer, or the content distribution network 100 will be receiving and processing all network packets which are sent to the network interface. Network interface can have IP addresses associated with it. A tunnel network interface ("TNI") can be a type of network interface which is attached to the content distribution network 100 and used to establish tunnel between the origin server site 110 and the content distribution network 100, in some embodiments. A stream socket can be a representation of the network connection with the clients 180A-180N, in some embodiments. It can have associated information about the remote endpoint on a particular client 180A-180N, as well as the corresponding network connection state.

In the embodiments shown in FIG. 1, the content distribution network 100 comprises a plurality of points of presence, 120A-120N. Each of the content distribution network's points of presence 120A-120N caches values obtained from one of the origin servers 112 at the origin server site 110, at the content cache layer. Each point of presence might cache values from multiple origin server sites, in some embodiments. Each origin server site might correspond to a different merchant that uses the CDN to communicate with clients, for example. In some embodiments, clients seeking content from the origin site 110 may interact primarily with the content edge servers 122A-122N at the points of presence 120A-120N, rather than with the origin server(s) 112. When processing requests for content from client devices 180A-180N, the content edge servers 122A-122N may first attempt to deliver content from their local content caches, and if the content is not cached locally, the content edge servers may obtain the requested content from the origin server(s) 110. Content caches may implement caching policies such that elements of content may expire and be removed from the caches (e.g., if the elements of content have not been requested by clients within a configurable period of time). However, elements of content may not necessarily expire from the content storage 111 of the origin server(s) 110. Any suitable storage technologies may be used to implement the content storage 111 and/or any content caches.

In the simplest embodiments, after a request is received from a client, the point of presence 120A-120N of the CDN 100 communicates directly with an origin server 112 of the appropriate origin site 110. A content edge server 122A-122N of the point of presence might be the component that communicates with the origin. In these embodiments, after the origin receives the request, the origin can retrieve the data from, for example, its storage devices, and then sends a response back to the point of presence within the CDN.

The content edge server 122A-122N can eventually provide the requested content to the client 180A-180N, in some embodiments. This requested content might comprise an indicator for transaction processing in some part of the requested content. The client might use this received content to send a transaction request to the content edge server 122A-122N. A client might generate a POST request from a URL encoded webpage, for example. This POST request might contain some details regarding a transaction, such as an identification of the merchant and a quantity of items to be transacted. For example, an end user might click on the "Buy" or "Watch Now" buttons, in some embodiments, to generate this request. The content edge server 122A-122N then, in some embodiments, receives this transaction request, such as a POST request, from the client that might include this indicator for transaction processing.

The content edge server 122A-122N, or a different server, such as the transaction processing edge server 121A-121N can then determine that transaction processing is indicated for handling this new request from the client, such as the POST request, in some embodiments. In some embodiments the transaction processing edge servers 121A-121N can be entirely different servers than the content edge servers 122A-122N. In other embodiments, the different servers might be part of a single component, device, or physical server, with the content edge servers 122A-122N and the transaction processing edge servers 121A-121N representing different functionality of the single component, device, or physical server. In order to determine that transaction processing is indicated for handling this new request from the client, the appropriate edge server might detect the indicator for transaction processing as part of the new request, in some embodiments. However, there are other ways the appropriate edge server might determine that transaction processing is indicated for handling a new request besides detection of an indicator for transaction processing. Other properties of the request might be used, for example, and the indicator for transaction processing is only one embodiment.

After determining that transaction processing is indicated for handling this new request, the transaction processing edge server 121A-121N can then send a transaction notification to an origin, in some embodiments, such as the origin associated with the identified merchant in the POST request, for example. This transaction notification might include a customer identification, a product number, and a quantity being requested, in some embodiments. In other embodiments, the transaction notification might include other information relevant to the context of the transaction. An origin server 112 at the origin site 110 can receive this transaction notification and can determine whether the transaction can proceed, in some embodiments. If the origin server 112 determines that the transaction can proceed, the origin can then send a transaction continuation response to the edge server.

The transaction processing edge server 121A-121N can receive this transaction continuation response from the origin, and then execute a data transaction with transaction entities 115 that are distinct from the content distribution network 100 and distinct from the origin site 110, in some embodiments. The transaction entities 115 might include some type of transaction processing 116. The type and functionality of these transaction entities will be dependent on the context of the transaction being transacted. The transaction processing edge server 121A-121N, or the point of presence 120A-120N associated with the appropriate transaction processing edge server 121A-121N, might maintain a pool of open connections with one or more of these transaction entities, and one of these open connections can used to execute the data transaction, in some embodiments. This pool of open connections might be secure connections, such as TLS connections, with two-way authentication, in some embodiments. In other embodiments, the transaction processing edge server 121A-121N or the associated point of presence 120A-120N, might establish a new connection with one or more transaction entities 115, or might otherwise communicate with one or more transaction entities 115 without an established connection.

The transaction processing edge server 121A-121N, or the associated point of presence 120A-120N, can also locally store information needed to process the transaction. This information can be communicated to the one or more transaction entities 115 in a communication to execute the data transaction. If the transaction is successful, the transaction processing edge server 121A-121N can notify one of the content edge servers 122A-122N of the successful completion of the data transaction for responding to the client request. The appropriate content edge server 122A-122N can then notify the client of the successful transaction, in some embodiments. The transaction processing edge server 121A-121N might then notify the origin of the successful transaction. In other embodiments, the transaction processing edge server 121A-121N might only notify the origin that the transaction is successful, and then the origin might in turn notify the client that the transaction is successful. This communication between the origin and the client might occur through the CDN 100, including through the appropriate content edge server 122A-122N, in some embodiments.

However, this concept used in the embodiments which involve only a point of presence 120A-120N of the CDN 100 communicating directly with an origin server 112 of the appropriate origin site 110, can be extended to include a CDN that has multiple cache layers, in other embodiments. After a downstream cache layer receives a request, in these embodiments, the downstream cache layer can retrieve data from, for example, an upstream layer such as the origin, and then sends a response back to the downstream cache layer, for example. The procedures outlined above can be extended to the communication between the client and the most downstream layer of the CDN. This most downstream layer could be, for example, an edge server at a point of presence. The client or customer can make a request to an edge server at a point of presence. After the edge server at a point of presence receives the request, in these embodiments, this CDN layer retrieves the data from, for example, further upstream layers such as the origin, and then sends a response back to the client or customer.

Figure 2:
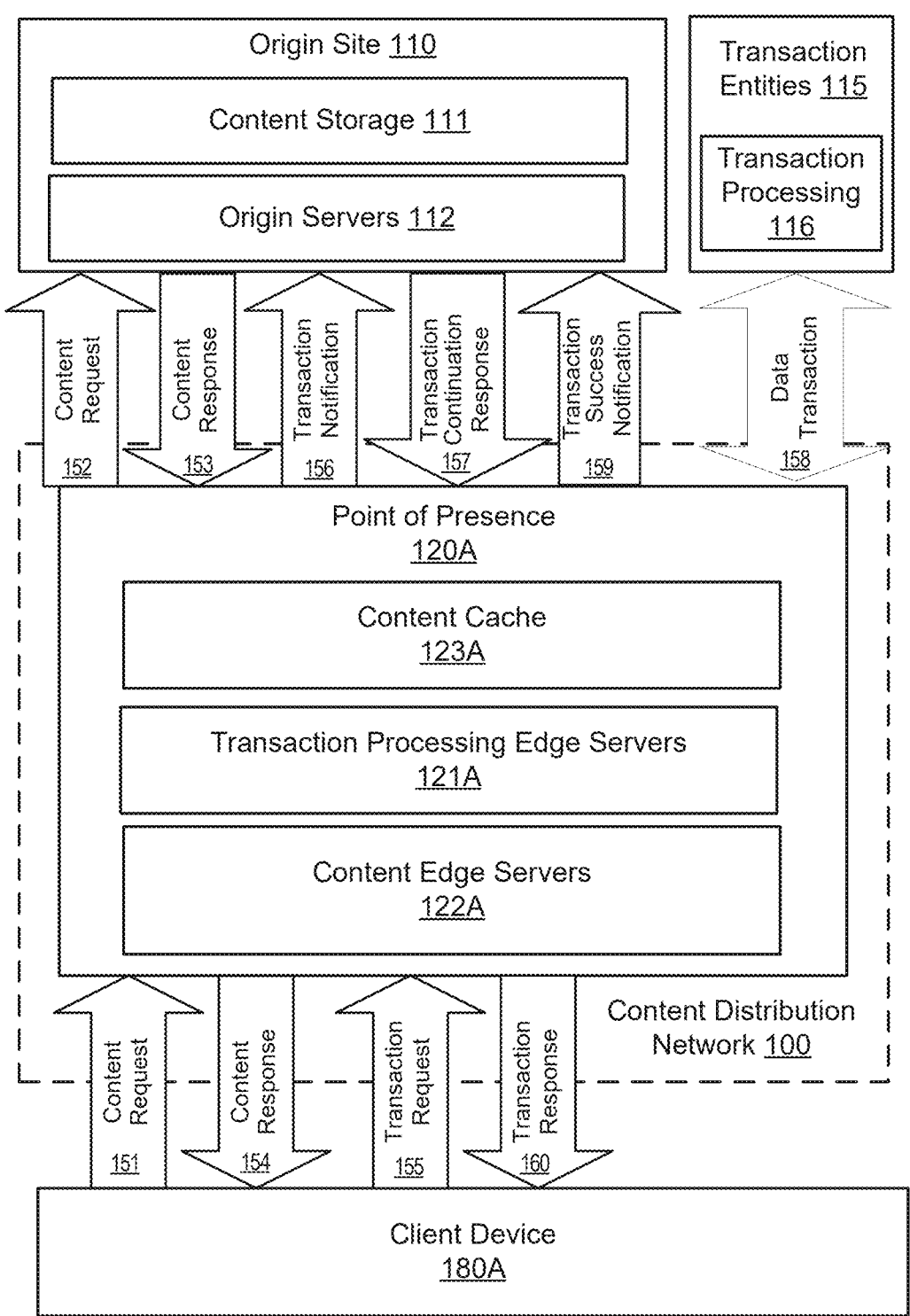
FIG. 2 illustrates further aspects of the example system for transaction processing at edge servers in a content distribution network, where a point of presence receives a content request from a client, sends a content request to an origin, receives a content response from the origin, provides a content response to the client, receives a transaction request from the client, provides a transaction notification to the origin, receives a transaction continuation response from the origin, initiates a data transaction with transaction entities, provides a transaction success notification to the origin, and provides a transaction response to the client, according to at least some embodiments.

FIG. 2 illustrates further aspects of the example system for transaction processing at edge servers in a content distribution network, where a point of presence 120A receives a content request 151 from a client 180A, sends a content request 152 to an origin 110, receives a content response 153 from the origin 110, and provides a content response 154 to the client 180A. The point of presence then receives a transaction request 155 from the client 180A. It provides a transaction notification 156 to the origin, receives a transaction continuation response 157 from the origin, initiates a data transaction 158 with transaction entities 115. If the transaction is successful, it provides a transaction success notification 159 to the origin, and provides a transaction response 160 to the client, according to at least some embodiments.

More specifically, the content distribution network 100 comprises at least one point of presence, 120A. The content distribution network's point of presence 120A caches values obtained from one of the origin servers 112 at the origin server site 110, at the content cache 123A. The point of presence 120A might cache values from multiple origin server sites, in some embodiments. Each origin server site 110 might correspond to a different merchant that uses the CDN 100 to communicate with clients, for example. In some embodiments, a client device 180A seeking content from the origin site 110 may interact primarily with the content edge server 122A at the point of presence 120A, rather than with the origin server(s) 112. When processing requests for content 151 from a client device 180A, the content edge server 122A may first attempt to deliver content from its local content cache 123A in a content response 154, and if the content is not cached locally, the content edge server 122A may obtain the requested content from the origin server(s) 110 with a content request 152. The content cache 123A may implement caching policies such that elements of content may expire and be removed from the caches (e.g., if the elements of content have not been requested by clients within a configurable period of time). However, elements of content may not necessarily expire from the content storage 111 of the origin server(s) 110. Any suitable storage technologies may be used to implement the content storage 111 and/or any content cache 123A.

After a content request 151 is received from a client device 180A, the point of presence 120A of the CDN 100 can either communicate a content request 152 directly with an origin server 112 of the appropriate origin site 110, or can communicate the content request 152 through further layers of the CDN 100, depending on the embodiment. A content edge server 122A of the point of presence 120A might be the component that communicates with the origin server 112, in some embodiments. In some of these embodiments, after the origin server 112 receives the request 152, the origin server 110 can retrieve the data from, for example, content storage devices 111 associated with the origin site 110, and then sends a content response 153 back to the point of presence 120A within the CDN 100.

The content edge server 122A can eventually provide the requested content to the client 180A in a content response 154, in some embodiments. This requested content in the content response 154 might comprise an indicator for transaction processing in some part of the requested content. The client device 180A might use this received content to send a transaction request 155 to the content edge server 122A. A client might generate a POST request from a URL encoded webpage, for example. This POST request might contain some details regarding a transaction, such as an identification of the merchant and a quantity of items to be transacted. For example, an end user might click on the "Buy" or "Watch Now" buttons, in some embodiments, to generate this transaction request 155. The content edge server 122A then, in some embodiments, receives this transaction request 155, such as a POST request, from the client that might include this indicator for transaction processing.

The content edge server 122A, or a different server, such as the transaction processing edge server 121A can then determine that transaction processing is indicated for handling this new request from the client, such as the POST request, in some embodiments. In some embodiments the transaction processing edge server 121A can be an entirely different server than the content edge server 122A. In other embodiments, the different servers might be part of a single component, device, or physical server, with the content edge server 122A and the transaction processing edge server 121A representing different functionality of the single component, device, or physical server. In order to determine that transaction processing is indicated for handling this new transaction request 155 from the client, the appropriate edge server might detect the indicator for transaction processing as part of this transaction request 155, in some embodiments. However, there are other ways the appropriate edge server might determine that transaction processing is indicated for handling a new request besides detection of an indicator for transaction processing. Other properties of the request might be used, for example, and the indicator for transaction processing is only one embodiment.

After determining that transaction processing is indicated for handling this transaction request 155, the transaction processing edge server 121A can then send a transaction notification 156 to an origin site 110, in some embodiments, such as the origin site associated with the identified merchant in the POST request, for example. This transaction notification 156 might include a customer identification, a product number, and a quantity being requested, in some embodiments. In other embodiments, the transaction notification might include other or different information relevant to the context of the transaction. An origin server 112 at the origin site 110 can receive this transaction notification 156 and can determine whether the transaction can proceed, in some embodiments. If the origin server 112 determines that the transaction can proceed, the origin can then send a transaction continuation response 157 to the transaction processing edge server 121A.

The transaction processing edge server 121A can receive this transaction continuation response 157 from the origin, and then execute a data transaction 158 with transaction entities 115 that are distinct from the content distribution network 100 and distinct from the origin site 110, in some embodiments. The transaction entities 115 might include some type of transaction processing 116. The type and functionality of these transaction entities will be dependent on the context of the transaction being transacted. The transaction processing edge server 121A, or the point of presence 120A associated with the appropriate transaction processing edge server 121A, might maintain a pool of open connections with one or more of these transaction entities 115, and one of these open connections can used to execute the data transaction 158, in some embodiments. This pool of open connections might be secure connections, such as TLS connections, with two-way authentication, in some embodiments. In other embodiments, the transaction processing edge server 121A or the associated point of presence 120A, might establish a new connection with one or more transaction entities 115, or might otherwise communicate with one or more transaction entities 115 without an established connection.

The transaction processing edge server 121A, or the associated point of presence 120A, can also locally store information needed to process the transaction. This information can be communicated to the one or more transaction entities 115 in a communication to execute the data transaction 158. If the transaction is successful, the transaction processing edge server 121A can notify the content edge server 122A of the successful completion of the data transaction 158 for responding to the client request with a transaction response 160. If the transaction is not successful, then the transaction processing edge server 121A can notify the content edge server 122A of the unsuccessful completion of the data transaction 158 for responding to the client request with a transaction response 160. The content edge server 122A can then notify the client of the either successful or unsuccessful transaction 160, in some embodiments. The transaction processing edge server 121A might then notify the origin of the successful transaction 159. In other embodiments, the transaction processing edge server 121A might only notify the origin that the transaction is successful 159, and then the origin might in turn notify the client that the transaction is successful with a transaction response 160. This communication between the origin and the client might occur through the CDN 100, including through the content edge server 122A, in some embodiments.

Figure 3:
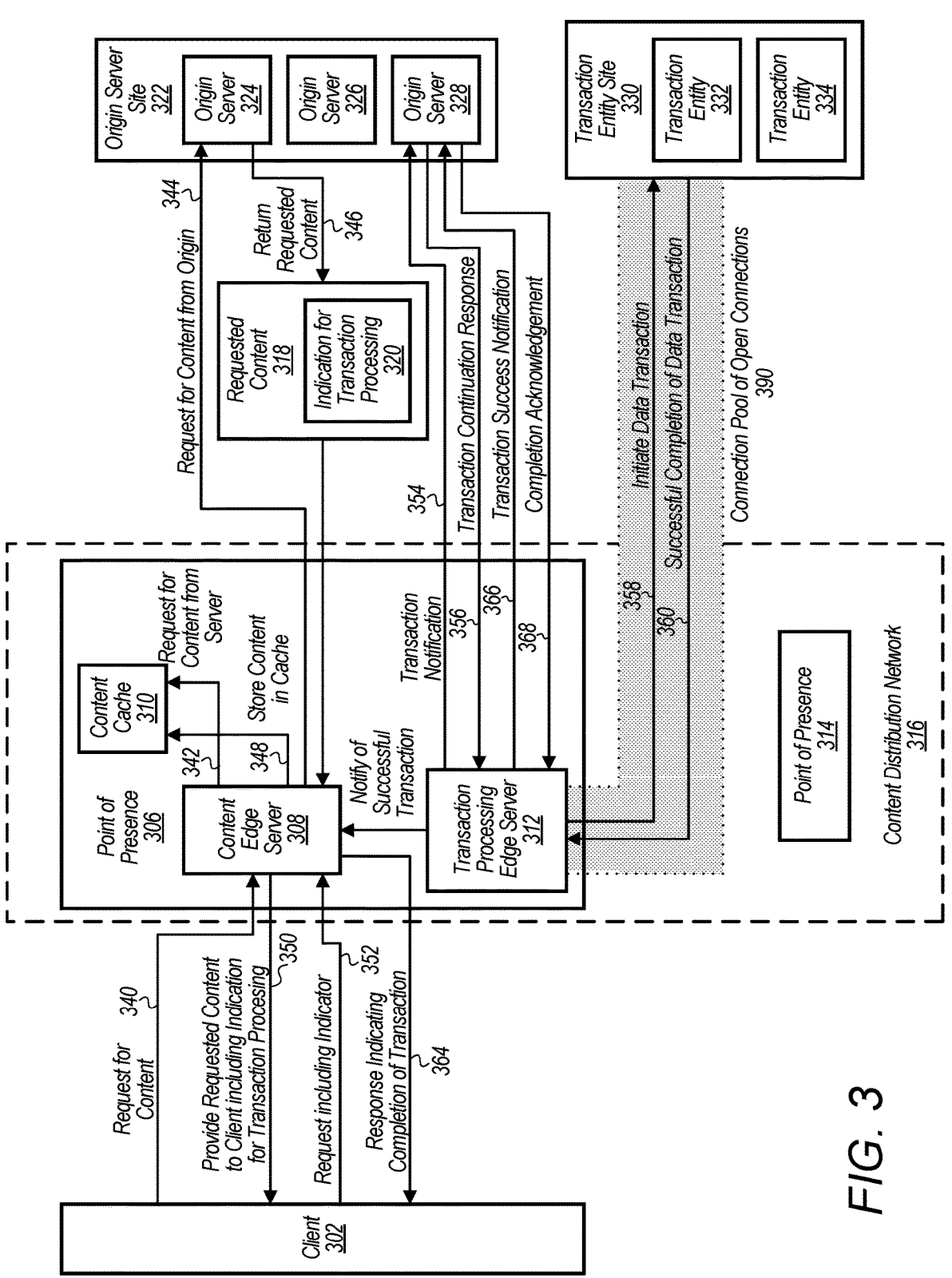
FIG. 3 illustrates further aspects of the example system for transaction processing at edge servers in a content distribution network, according to at least some embodiments.

FIG. 3 illustrates further aspects of the example system for transaction processing at edge servers in a content distribution network, according to at least some embodiments. The transaction processing begins at communication 340 where content edge server 308 at a point of presence of a content distribution network receives an initial request for content from a client. At 342, the content edge server 308 checks the content cache 310 for a locally stored copy of the content. The content edge server 308 determines whether the request can be fulfilled by the point of presence. If the request can be fulfilled, then the content edge server simply provides the requested content to the client in communication 350. If the request cannot be fulfilled by the current point of presence, then the content edge server 308 requests content from the origin in communication 344. An origin server 324 at an origin server site 322 sends the requested content 318, including an indication for transaction processing 320, to the content edge sever 308 in communication 346. At 348, the content edge server stores the received content in a local content cache.

The content edge server provides the requested content to the client, including the indication for transaction processing that was previously received from the origin at communication 350. In communication 352 the content edge server receives a request from the client 302, possibly including the indication for transaction processing. Using either the indication or through another means, the content edge server determines that the transaction processing is indicated for handling the request. The transaction processing edge server 312 then sends a transaction notification 354 to an origin server 328 at the origin server site 322 in communication 354. With communication 356, the origin server 328 sends transaction processing edge server 312 a transaction continuation response. The point of presence executes a data transaction with one or more transaction entities in a communication 358. These transaction entities are outside the point of presence and distinct from the origin. The transaction processing edge server 312 can utilize a connection pool of open connections 390 if one exists. The transaction processing edge server 312 then determines whether the data transaction successfully completed within a certain time threshold. It might use a successful completion of data transaction communication 360 to make this determination. If it did not successfully complete, then the transaction is cancelled. If it did successfully complete, then two operations happen in parallel. First the transaction processing edge server 312 notifies the content edge server 308 of a successful transaction. The content edge server 308 then sends a response to the client in communication 364 comprising a notification of the successful completion of the data transaction. In addition, the transaction processing edge server 312 sends a transaction success notification to the origin at communication 366. In a communication labeled 368, the origin server 328 sends transaction processing edge server 312 a completion acknowledgement 368 of the transaction from the origin.

Figure 4:
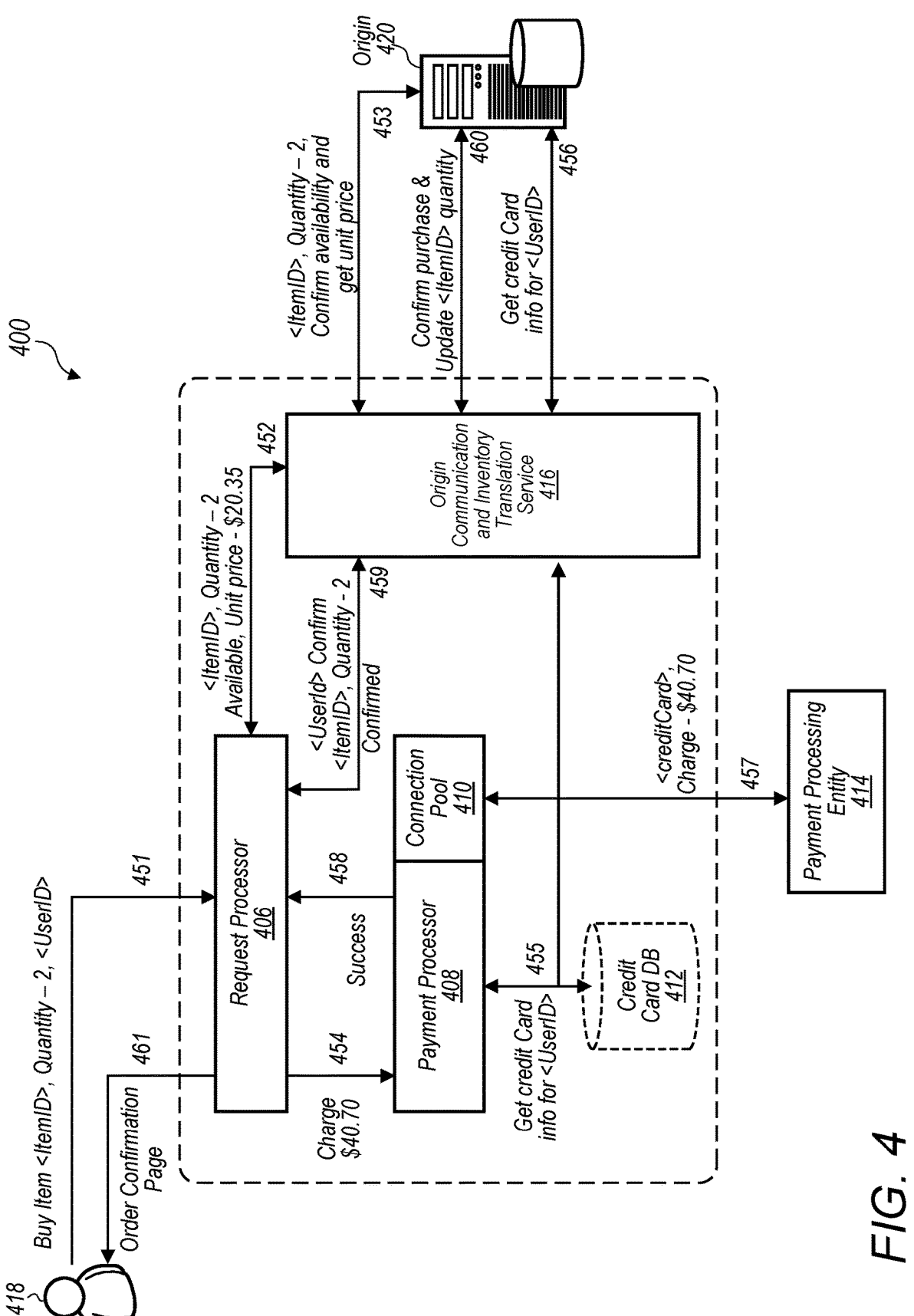
FIG. 4 illustrates an example system for payment processing at edge servers in a content distribution network, according to at least some embodiments.

FIG. 4 illustrates an example system for payment processing at edge servers in a content distribution network, according to at least some embodiments. In some embodiments, a use case for transaction processing at edge servers could be a payment processing system. In an exemplary payment processing system, an end user 418 might send a request 451 to a request processor 406. This request might include an instruction to "Buy Item" with an item identification ("ItemID"), a quantity of the item to purchase, and a user identification ("UserID") of the end user making the request. In the embodiment shown in FIG. 4, the quantity requested is 2. Previously, a customer of a CDN, such as an online retailer, might have provided an indication for transaction processing in its webpages. In some embodiments, these can be via tags such as *<tag type:CDN-payment>*. In some embodiments, when this tag is included in a request 451 from the end-user 418, for example when the end-user 418 clicks on a "Buy it now" button, then this tag tells the request processor 406 that the transaction processing associated with this request 451 is to be handled by the CDN's payment processor 408. The request 451 might or might not include the indication for transaction processing, depending on the embodiment.

The request processor 406 can analyze the request 451 from the client, in some embodiments, to determine the appropriate details of the transaction. The request processor 406 can communicate 452 with an origin communication and inventory translation service 416. This communication 452 can include details of the requested transaction 451 from the end user 418. For example, the communication can include the ItemID, quantity, and/or UserID. The origin communication and inventory translation service 416 can then communicate 453 with the origin 420. The origin communication and inventory translation service 416 can pass to the origin 420 whatever parameters are needed to determine if the items are available, in some embodiments. The communication 453 might comprise a request to reserve a quantity of the item. This communication 453 might include the ItemID, quantity, and/or UserID, for example. As a further example, the origin might be sent 453 the following parameters: "Seller: MerchantX", "Item: ProductY", "Quantity: 2". The communication 453 might comprise a request for availability of the item, and might also comprise a request for a unit price, depending on the embodiment.

In the embodiments shown in FIG. 4, the origin 420 responds 453 with an availability indication and a unit price. The origin 420 might respond with additional or different information, depending on the embodiment. As a further example, the origin 420 corresponding to MerchantX might then respond 453 with an indication of "yes. Proceed with payment." The origin communication and inventory translation service 416 can then respond 452 to the request processor 406 with the availability and unit price of the requested item, in some of these embodiments.

The request processor 406 can then request 454 the payment processor 408 to initiate a payment transaction for the item. The request 454 to the payment processor 408 might include a charge amount, as well as the userID or information about the purchaser, depending on the embodiment. The payment processor might then attempt to retrieve 455 the credit card information for the transaction. For example, the CDN might include a credit card database 412 of end user's credit card numbers to use for payment processing by the payment processor 408. For example, if a customer has already purchased something with the merchant in the last year, then their credit card details might be available in storage 412 at a point of presence within the CDN. If a client's transaction details are not available in a credit card database 412, the the payment processor might query 455 the merchant's origin site 420 to get updated details, which in the payment processing context can be customer credit card details. In the embodiments shown in FIG. 4, the payment processor 408 might request 455 the origin communication and inventory translation service 416 to communicate 456 with an origin 420 to get credit card information for a specific UserID. The origin communication and inventory translation service 416 might initiate such a request 456 to the origin and respond 455 to the payment processor 408 with the requested credit card information. The credit card information might be stored in the credit card database 412 for further use.

The payment processor 408 can then attempt to execute a payment transaction 457, in some embodiments, with a payment processing entity 414, like a credit card server, for example. The payment processor 408 might use a connection pool 410 of open connections with the payment processing entity 414 to execute such a transaction. If a connection pool 410 is not available, or if an open connection in a connection pool is not available, then the payment processor might wait for an open connection, or might initiate a new connection with the payment processing entity 414. The communication 457 with the payment processing entity 414 might comprise a request to charge a specific credit card by a specific charge amount, for example. If the charge is successful, the payment processor 408 can notify 458 the request processor 406 of a successful transaction. If the charge is not successful, the payment processor 408 can notify 458 the request processor 406 of an unsuccessful transaction.

The request processor 406 can then notify 461 the end user 418 and/or the origin of the successful or unsuccessful transaction, depending on the embodiment. The request processor might send a communication 459 to the origin communication and inventory translation service 416, which might include a user ID, item ID, quantity, and/or a confirmation of the transaction, in some embodiments. The origin communication and inventory translation service 416 might then communicate 460 with the origin 420 regarding the transaction. The communication 460 might comprise a confirmation of the purchase and/or an update of the quantity of the item, along with possibly the item ID, depending on the embodiment. Either the origin 420, or the request processor 406, might then send an order confirmation page 461 to the end user 418.

Transaction Processing at Edge Servers in a Provider Network

This section describes example provider network environments in which embodiments of transaction processing at edge servers in a content distribution network may be implemented. However, these example provider network environments are not intended to be limiting.

Figure 5:
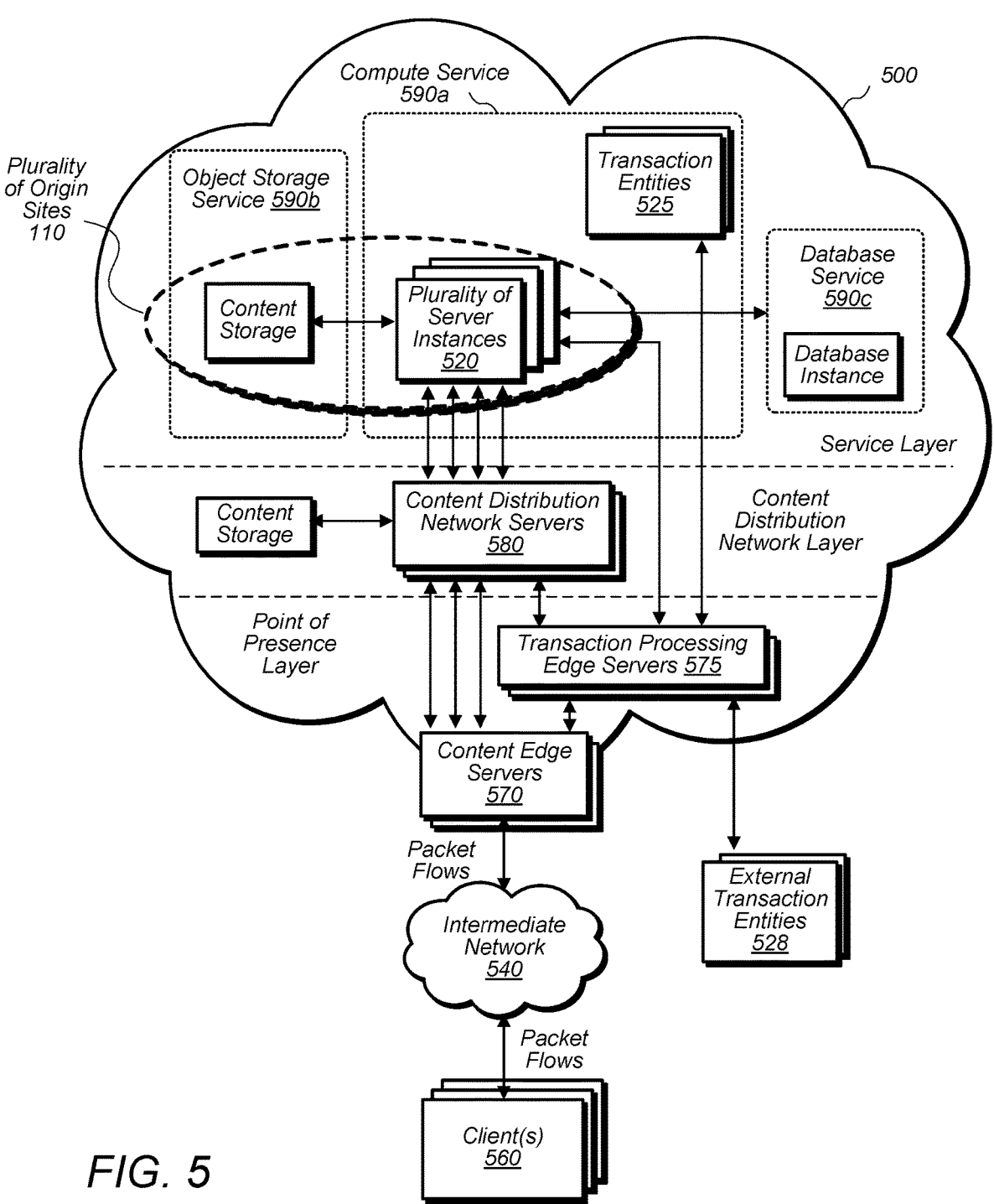
FIG. 5 illustrates a transaction processing at edge servers, a content distribution network, an origin site, and transaction entities in an example provider network environment, according to at least some embodiments.

FIG. 5 illustrates a point of presence layer including content edge servers 570 and transaction processing edge servers 575, according to some embodiments. FIG. 5 also illustrates a content distribution network layer comprising content distribution network servers 580 and associated content storage, according to some embodiments. This content distribution network layer might comprise additional layers of a content distribution network, besides the servers and storage of a point of presence, in some embodiments. In other embodiments, the content distribution network layer is not present, and the point of presence layer communicates directly with the service layer. FIG. 5 also illustrates a service layer comprising a plurality of origin sites 110, where each origin site comprises a plurality of server instances 520 and associated content storage, according to some embodiments. The service layer also comprises internal transaction entities 525 in an example provider network environment. FIG. 5 also illustrates external transaction entities 528 which do not comprise the provider network 500, according to at least some embodiments. A provider network 500 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 500. In some embodiments, the provider network 500 may also provide public IP addresses and/or public IP address ranges (e.g., Internet Protocol version 4 (IPv4) or Internet Protocol version 6 (IPv6) addresses) that clients may obtain from the provider 500.

Conventionally, the provider network 500, via the virtualization services, may allow a client of the service provider (e.g., a client that operates clients 560) to dynamically associate at least some public IP addresses assigned or allocated to the client with particular resource instances assigned to the client. The provider network 500 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 560 may, for example, implement client-specific applications and present the client's applications on an intermediate network 540, such as the Internet. Either the clients 560 or other network entities on the intermediate network 540 may then generate traffic to a destination domain name published by the clients 560. First, either the clients 560 or the other network entities make a request to the content edge servers 570 for content in the content storage of an origin site 110, where the origin site is implemented by a plurality of compute instances 520.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 500; a client may then assign their allocated public IP addresses to particular resource instances allocated to the client. These public IP addresses may be referred to as client public IP addresses, or simply client IP addresses. Instead of being assigned by the provider network 500 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 500 may provide a compute service 590*a* implemented by physical server nodes to clients 560, which includes a plurality of compute instances 520, 525. The compute service also contains many other server instances for many other clients and other customers of the provider network 500. Each of the plurality of origin sites 110 might comprise its own set of server instances 520 and content storage, for example. As another example, the provider network provides a virtualized data storage service or object storage service 590*b* which can include a plurality of data storage instances implemented by physical data storage nodes. The data storage service or object storage service 590*b* can store files for the client, which are accessed by the appropriate server instance of the client. As another example, the provider network might provide a virtualized database service 590*c* implemented by database nodes, which includes at least one database instance for a client. A server instance pertaining to the client in the compute service can access a database instance pertaining to the client when needed. The database service and data storage service also contain multiple files or database instances that pertain to other clients and other customers of the provider network 500. The provider network can also include multiple other client services that pertain to one or more customers. The clients 560 may access any one of the client services 590*a*, 590*b*, or 590*c*, for example, via an interface, such as one or more APIs to the service, to obtain usage of resources (e.g., data storage instances, or files, or database instances, or server instances) implemented on multiple nodes for the service in a production network portion of the provider network 500.

Communication from the clients to an instance of a service can be routed to the appropriate instance by the content distribution network 580. Server nodes in the compute service 590a may each implement a server, for example a web server or application server or a cloud-based browser that might comprise an origin site. One or more content distribution network servers 580 may be implemented in a network connection manager layer between the border network and the production network. The transaction processing edge server 575 can communicate with either internal transaction entities 525, that can be implemented by the compute service 590a, or with external transaction entities 528, in order to execute a data transaction with the appropriate transaction entities. Content edge server(s) 570 may receive packets (e.g., TCP packets) in packet flows from clients 560 via an intermediate network 540 such as the Internet, and forward the packets to the appropriate content distribution network server 580, or the appropriate server node or instance 520 of the origin site 110. Or it might forward the packets containing a public IP address to an apparatus that can map the public IP address to a private IP address. The packets may be targeted at the public IP address(es) included in responses to requests. The content distribution network servers 580 may use the procedures described herein to determine target server nodes or compute instances in the plurality of server instances 520 for the packet flows, and to facilitate traffic between the compute instances and the clients 560.

Customer-Specified Functions

Figure 6:
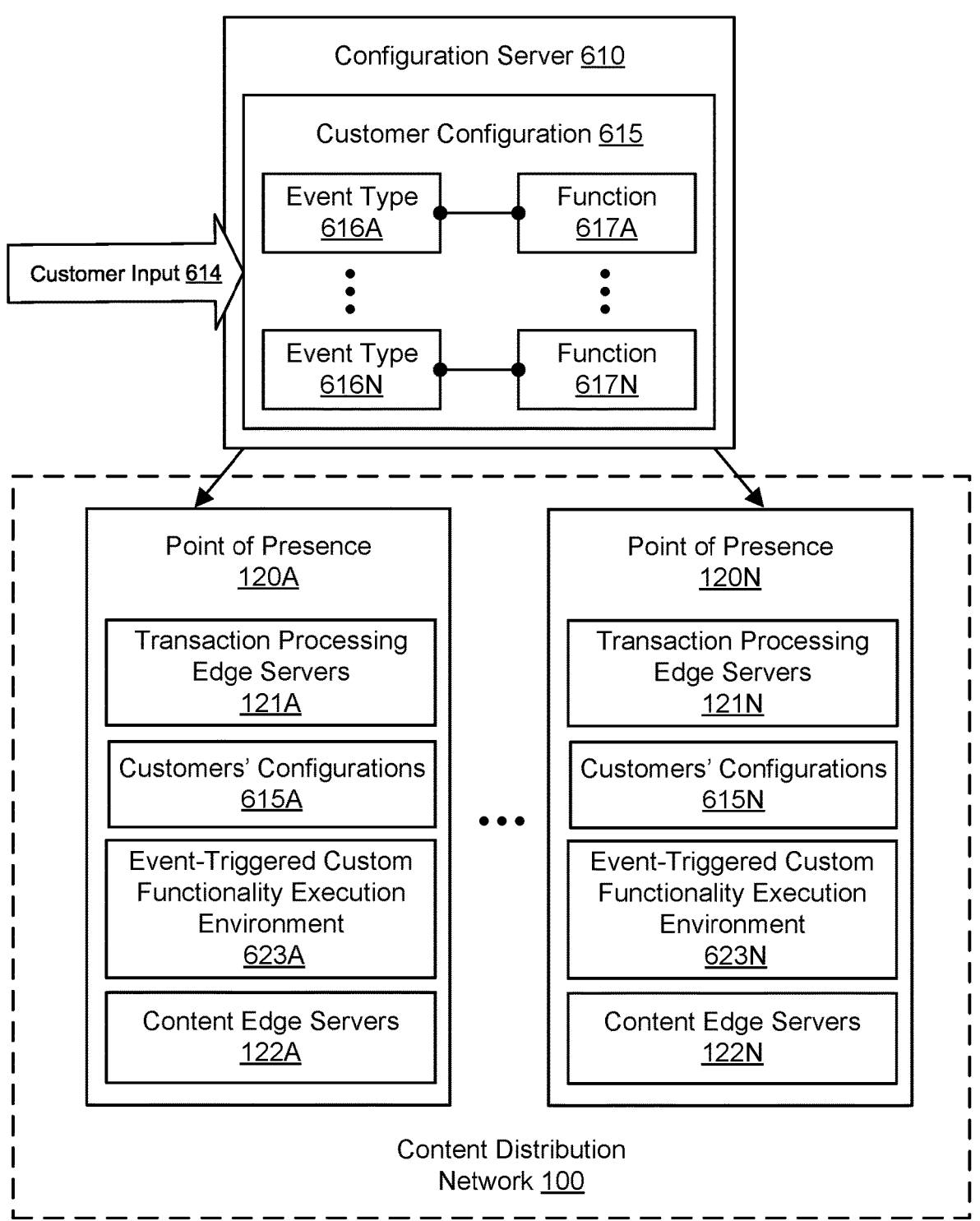
FIG. 6 illustrates further aspects of the example system for transaction processing at edge servers in a content distribution network, including customer-specified functions associated with events, according to at least some embodiments.

FIG. 6 illustrates further aspects of the example system for transaction processing at edge servers in a content distribution network, including customer-specified functions associated with events, according to at least some embodiments. The points of presence 120A-120N may be customized by one or more customers or other users of the CDN 100. The customer that customizes the points of presence can be the same customer that controls the appropriate origin site, and that is using the CDN to deliver content and to process transactions. In one embodiment, customer input 614 may be used to specify, define, or otherwise determine (at least in part) a customer configuration 615 for performing event-triggered computations while processing transactions at the edge servers. Customers of the CDN 100 may represent entities (e.g., persons, businesses, and/or other organizations) that seek to have the CDN deliver content (e.g., content supplied or selected by the customers) to the client devices 180A-180N, such that content may be said to be delivered to clients on behalf of a customer. The customer input 614 may represent input provided by a particular customer of the CDN 100, and the customer configuration 615 may represent a configuration for that customer. In one embodiment, additional customer configurations maintained by the configuration server 610 may include additional configurations for additional customers. In one embodiment, the customer configuration 615 may relate to a particular application or dataset for the particular customer, and the particular customer may specify additional customer configurations for additional applications or additional datasets. Accordingly, the customer configuration 615 may represent an event-triggered computation policy for a particular customer (and potentially for a particular application or particular dataset for that customer).

The customer input 614 may be provided by the customer using any suitable interface(s), such as an application programming interface (API) and/or graphical user interface (GUI). For example, a GUI for modifying the customer configuration 615 may be presented using controls in a web page, and a customer may use a web browser to access the web page to modify the customer configuration. The customer input 614 may be provided to a centralized component such as a configuration server 610 to specify the customer configuration 615. The customer configuration 615 may then be propagated to the edge servers 120A-120N from the configuration server 610. These customer configurations join with other customer configurations in a customers' configurations component 615A-615N. Updates to the customer configuration 615 (e.g., based on additional customer input) may also be made at the configuration server 610 and then pushed to the edge servers 120A-120N to be stored in the customers' configurations component 615A-615N which might include multiple configurations for multiple different customers. In this manner, the same event-triggered computation policy may be implemented for a particular customer (and potentially for a particular application or particular dataset for that customer) across a plurality of edge servers, such as edge servers 120A-120N. The configuration server 610 may be positioned in any suitable location with respect to the edge servers 120A-120N and may be implemented by the example computing device 1000 illustrated in FIG. 10.

In one embodiment, the customer configuration 615 may associate or link various event types with various functions. As shown in the example of FIG. 6, the customer configuration 615 may specify an associated function for any of a plurality of event types 616A-616N. For example, based on customer input 614, event type 616A may be associated with function 617A, and event type 616N may be associated with function 617N. Although event types 616A-616N and functions 617A-617N are shown for purposes of illustration and example, it is contemplated that any suitable number and configuration of event types and functions may be used with the customer configuration 615. In one embodiment, a particular event type may not have an associated function. The event types 616A-616N may generally relate to events that may be encountered during the preparation and/or delivery of content from one of the points of presence 120A-120N to one of the client devices 180-180N and/or in the execution of the transaction processing by the transaction processing edge servers 121A-121N.

The functions 617A-617N and their associations with the corresponding event types 616A-616N may be specified by the customer, e.g., using the customer input 614. In one embodiment, the functions 617A-617N may be uploaded to the configuration server 610 by the customer. In one embodiment, the functions 617A-617N may be selected by the customer from a set of predefined functions. At least some of the predefined functions may be provided by the customer and/or additional customers. The functions 617A-617N may comprise sets of program code (including program instructions) that can be executed using any suitable execution techniques (including the use of interpretation, compilation, and/or just-in-time compilation) on the points of presence 120A-120N. Accordingly, the functions 617A-617N may be specified by the customer in any suitable format, including a scripting language, a high-level programming language, compiled program code, or any other suitable format or combinations of formats. In one embodiment, one or more of the functions 617A-617N may refer to a read-only data store as a source of input. The read-only data store may be specified by the same customer and may be propagated to the points of presence 120A-120N for use with the functions 617A-617N.

By implementing customizable event-triggered computation, the points of presence 120A-120N may execute customer-specified or user-specified functions at any suitable event during the processing of content requests or transaction requests from client devices 180A-180N. For example, the customer-specified functions may modify content and/or transaction requests from clients, modify responses to content and/or transaction requests, modify origin requests to the origin server(s), modify responses to origin requests to the origin server(s), modify error notifications (e.g., to clients, when requested content cannot be delivered or a transaction cannot be completed), and/or generate metrics and/or log entries after processing a content and/or transaction request. Each of the points of presence 120A-120N may include one or more modules, components, or other elements of functionality that implement customizable event-triggered computation. For example, each point of presence 120A-120N may include a functionality for event-triggered computation, such as event-triggered custom functionality execution environment 623A at point of presence 120A, and event-triggered custom functionality execution environment 623N at point of presence 623N.

Illustrative Methods of Transaction Processing at Edge Servers in a CDN

Figure 7:
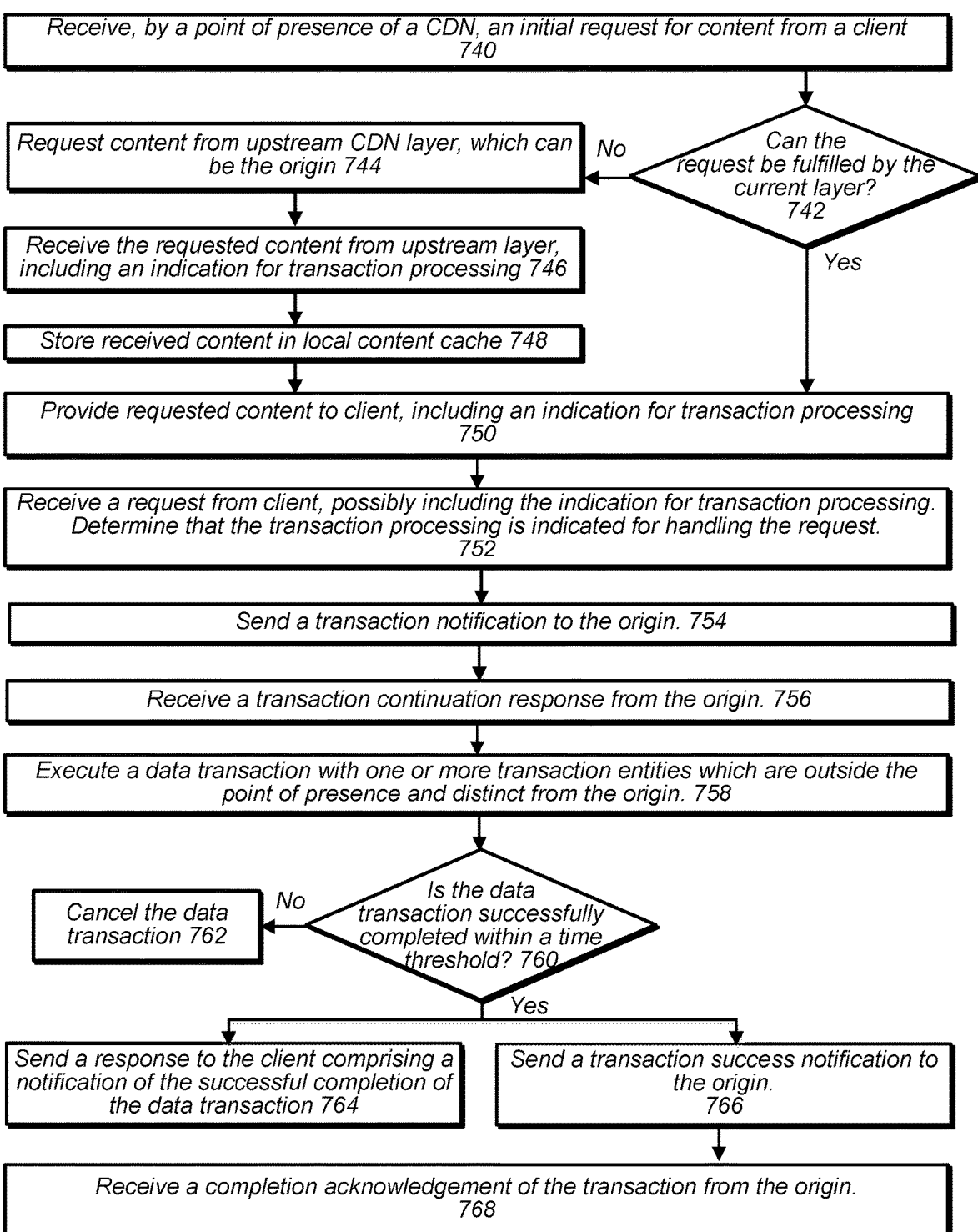
FIG. 7 is a flowchart of an illustrative method of transaction processing at edge servers in a content distribution network, where a point of presence receives a content request from a client, sends a content request to an origin, receives a content response from the origin, provides a content response to the client, receives a transaction request from the client, provides a transaction notification to the origin, receives a transaction continuation response from the origin, initiates a data transaction with transaction entities, provides a transaction success notification to the origin, and provides a transaction response to the client, according to at least some embodiments, according to at least some embodiments.

FIG. 7 is a flowchart of an illustrative method of transaction processing at edge servers in a content distribution network, where a point of presence receives a content request from a client, sends a content request to an origin, receives a content response from the origin, provides a content response to the client, receives a transaction request from the client, provides a transaction notification to the origin, receives a transaction continuation response from the origin, initiates a data transaction with transaction entities, provides a transaction success notification to the origin, and provides a transaction response to the client, according to at least some embodiments, according to at least some embodiments. The flowchart begins at block 740 where a point of presence of a content distribution network receives an initial request for content from a client. The flowchart transitions to block 742 where it is determined whether the request can be fulfilled by the point of presence. If the request can be fulfilled, then the flowchart transitions to block 750. If the request cannot be fulfilled by the current point of presence, then the point of presence requests content from an upstream CDN layer in block 744. This upstream CDN layer can be the origin. Then, in block 746, the point of presence receives the requested content from upstream layer, including an indication for transaction processing. The flowchart transitions to block 748 which stores the received content in a local content cache.

Block 750 provides the requested content to the client, including the indication for transaction processing that was previously received from the origin. The flowchart transitions to block 752 which receives a request from client, possibly including the indication for transaction processing. Using either the indication or through another means, the point of presence determines that the transaction processing is indicated for handling the request. The point of presence then sends a transaction notification to the origin in block 754. In block 756, the point of presence receives a transaction continuation response from the origin. In block 758, the point of presence executes a data transaction with one or more transaction entities. These transaction entities are outside the point of presence and distinct from the origin. The flowchart transitions to block 760 where it determines if the data transaction successfully completed within a certain time threshold. If it did not, then the transaction is cancelled in 762. If it did then the following two operations can happen in parallel, or sequentially, depending on the embodiment. First, the point of presence can send a response to the client comprising a notification of the successful completion of the data transaction in block 764. Second, a transaction success notification can be sent to the origin in block 766. The sending of the transaction success notification to the origin in block 766 causes a transition to block 768 where the point of presence receives a completion acknowledgement of the transaction from the origin.

Sending a response to the client comprising a notification of the successful completion of the data transaction in block 764 can happen at any time with respect to blocks 766 and 768. For example, sending a response to the client comprising a notification of the successful completion of the data transaction in block 764 can happen before, during, or after sending a transaction success notification to the origin in block 766. In addition, sending a response to the client comprising a notification of the successful completion of the data transaction in block 764 can happen before, during, or after receiving a completion acknowledgement of the transaction from the origin in block 768. In some embodiments, a response is sent to the client in block 764 before receiving a completion acknowledgement from the origin in block 768 so that the client is not kept waiting, and to reduce latency, for example. In other embodiments, a response is sent to the client in block 764 only after receiving a completion acknowledgement from the origin in block 768 so that the transaction is assured to be completed before notifying the client, for example.

Figure 8:
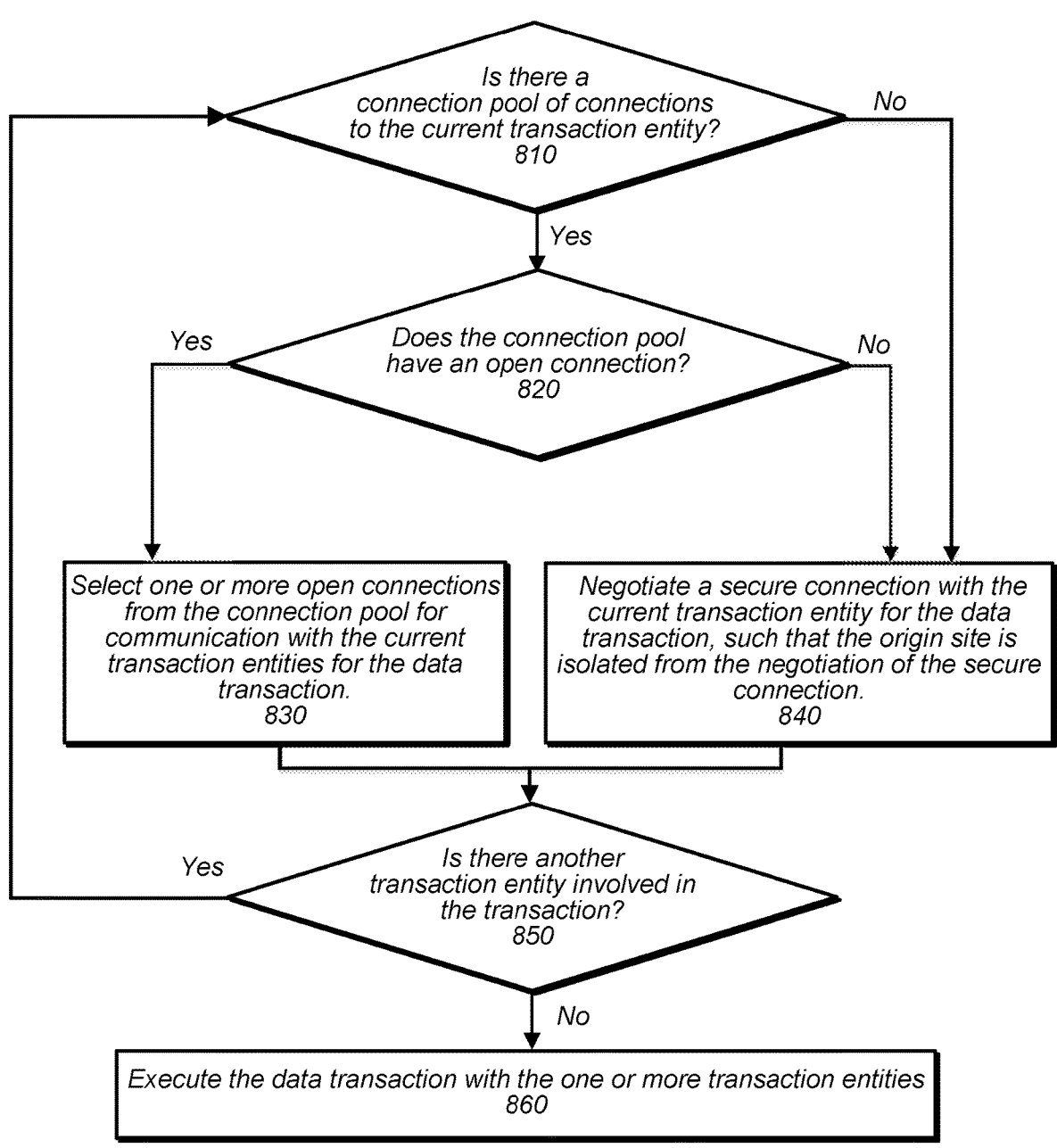
FIG. 8 is a flowchart of an illustrative method of selecting and/or negotiating secure connections with transaction entities for executing the data transaction, according to some embodiments.

FIG. 8 is a flowchart of an illustrative method of selecting and negotiating secure connections with transaction entities for executing the data transaction, according to some embodiments. The flowchart begins in block 810 where it determines if there is a connection pool of connections to the current transaction entity. If there is, then the flowchart determines if the connection pool has an open connection in block 820. If either of those decision points answer in the negative, then the flowchart transitions to block 840 which negotiates a secure connection with the current transaction entity for the data transaction, such that the origin site is isolated from the negotiation of the secure connection. After the data transaction is completed, the new secure connection can be terminated, or it can be added to the pool of open connections, depending on the embodiment. If both those decision points answer affirmatively, however, then the flowchart transitions to block 830 which selects one or more open connections from the connection pool for communication with the current transaction entities for the data transaction. Once the data transaction is finished, the one or more open connections that were used can be returned to the pool of open connections, in some embodiments. Blocks 830 and 840 both transition to block 850 which asks if there is another transaction entity involved in the transaction. If there is, then the flowchart repeats, starting at block 810 again. If not, then the flowchart transitions to 860 which executes the data transaction with the one or more transaction entities.

Figure 9:
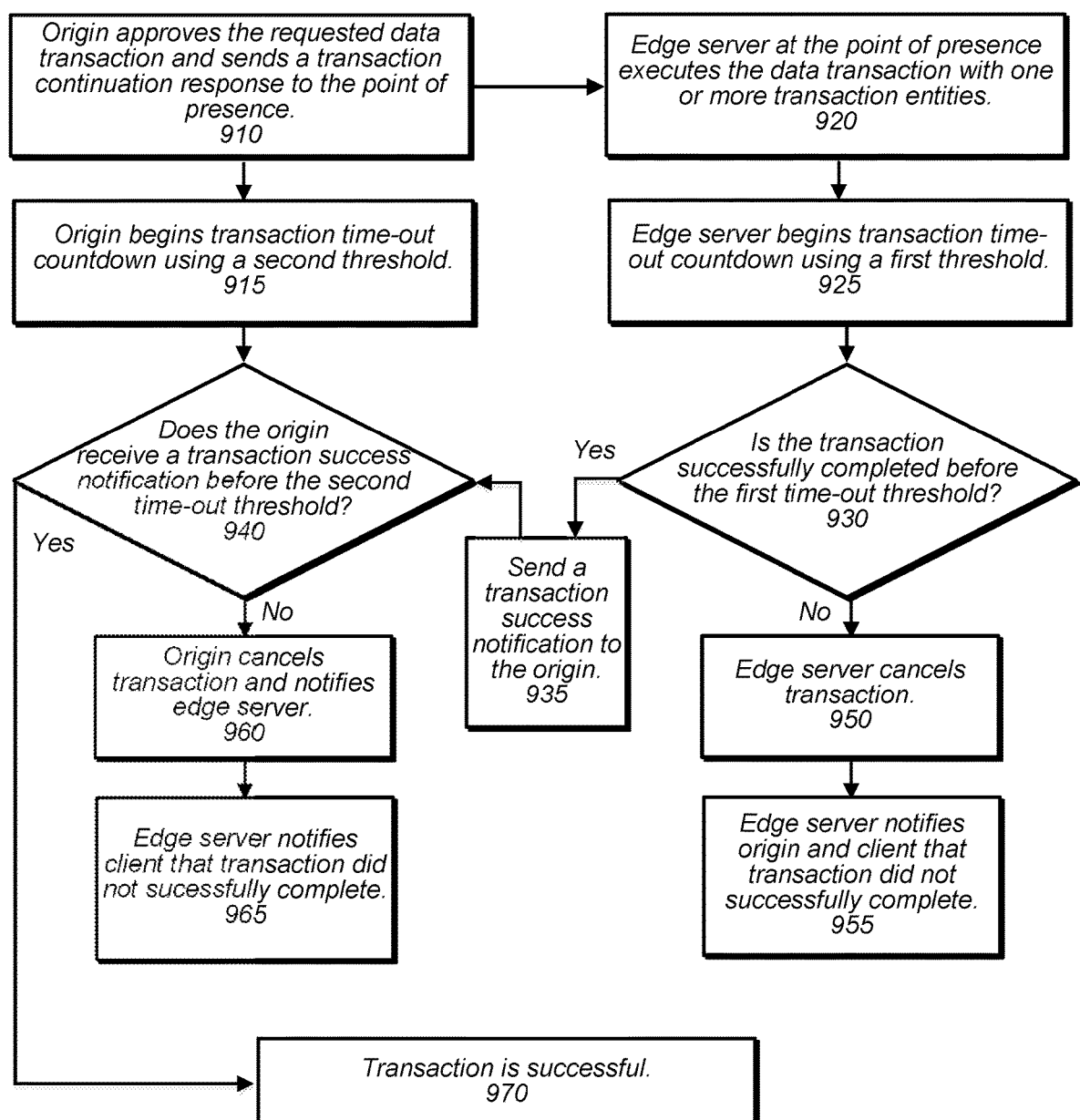
FIG. 9 is a flowchart of determining whether a transaction is successfully completed before both a first and second time-out threshold, according to at least some embodiments.

FIG. 9 is a flowchart of determining whether a transaction is successfully completed before both a first and second time-out threshold, according to at least some embodiments. The flowchart begins in block 910 where the origin approves the requested data transaction and sends a transaction continuation response to the point of presence. Then, two actions occur in parallel. First, the origin begins transaction time-out countdown using a second threshold in block 915. Also, the edge server at the point of presence executes the data transaction with one or more transaction entities at block 920. After the data transaction is initiated, the edge server begins transaction timeout countdown using a first threshold in block 925. The edge server determines whether the transaction successfully completed before the first time-out threshold in block 930. If the transaction dd not complete successfully before the first time-out threshold, then the edge server cancels the transaction in 950 and notifies the origin and the client that the transaction did not complete successfully in 955.

If the transaction did complete successfully before the first time-out threshold in block 930, then the edge server sends a transaction success notification to the origin in 935. The origin determines whether any transaction success notification was received before the second time-out threshold in block 940. If a transaction success threshold was not received in time, then the origin cancels the transaction in block 960 and notifies the edge server. The edge server then notifies the client that the transaction did not successfully compete in block 965. If the origin at block 940 does receive the transaction success notification before the second time-out threshold, then the transaction is successful in block 970.

Illustrative System

Figure 10:
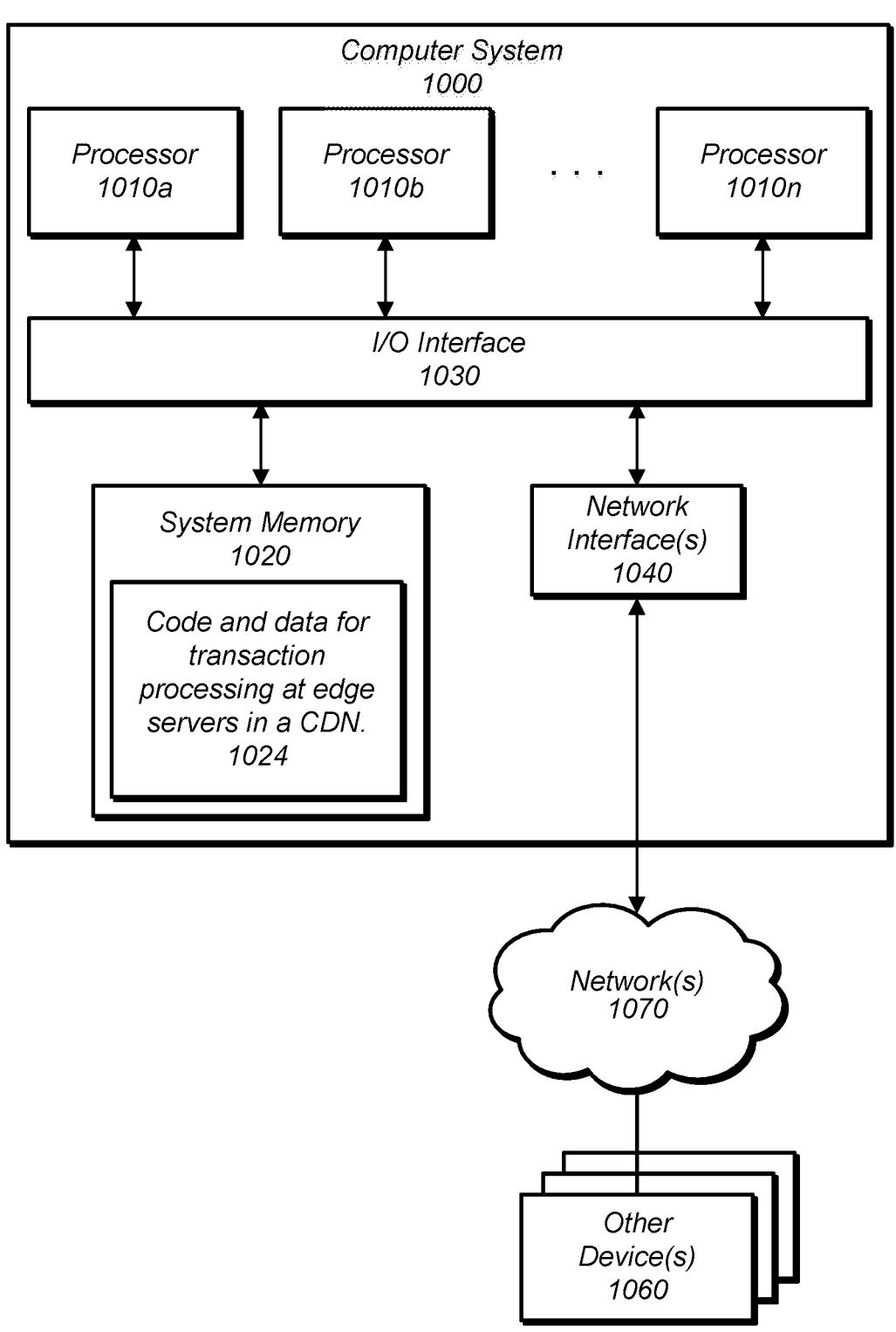
FIG. 10 is a block diagram illustrating an example computer system that may be used for transaction processing at edge servers in a CDN, according to some embodiments.

FIG. 10 is a block diagram illustrating an example computer system that may be used for transaction processing at edge servers in a CDN, according to some embodiments. In at least some embodiments, a computer that implements a portion or all of the methods and apparatus for transaction processing at edge servers in a CDN as described herein may include a general-purpose computer system or computing device that includes or is configured to access one or more computer-accessible media, such as computer system 1000 illustrated in FIG. 10. FIG. 10 is a block diagram illustrating an example computer system that may be used in some embodiments. This computer system can be used as a network connection manager 104, for example, or as a backend resource host which executes one or more of backend resource instances (such as 116) or one or more of the plurality of compute instances 916 in the compute service 990*a*. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an apparatus and method of transaction processing at edge servers in a CDN, are shown stored within system memory 1020 as the code and data for transaction processing at edge servers in a CDN 1024.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1070, such as other computer systems or devices as illustrated in FIGS. 1, 2, 4, and 5, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing transaction processing at edge servers in a CDN. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices of a point of presence of a content distribution network, the one or more computing devices configured to:

maintain, at the point of presence, a connection pool of one or more open connections with one or more transaction entities outside the content distribution network and distinct from an origin site of the content distribution network;

determine, by the one or more computing devices of the point of presence of the content distribution network, that transaction processing is indicated for handling a request from a remote client of the content distribution network based on one or more properties of the request from the remote client;

based on the determination, by the one or more computing devices of the point of presence of the content distribution network, that transaction processing is indicated for handling the request from the remote client of the content distribution network based on the one or more properties of the request from the remote client:

select an open connection from the connection pool maintained at the point of presence of the content distribution network for communication with one of the one or more transaction entities outside the content distribution network and distinct from an origin site of the content distribution network;

execute, based on the open connection, a data transaction with the transaction entity;

determine that the data transaction with the transaction entity has successfully completed; and responsive to the determination that the data transaction with the transaction entity has successfully completed, send a notification to an endpoint.

2. The system of claim 1, wherein to determine that the data transaction with transaction entity has successfully completed, the one or more computing devices are configured to:

determine that the data transaction successfully completed within a time threshold.

3. The system of claim 1, wherein the one or more computing devices comprises a content edge servicer and a transaction processing edge server, and wherein to send the notification to the endpoint, the transaction processing edge server is configured to perform one or more of:

notify the content edge server of the successful completion of the data transaction, or send a transaction success notification to an origin server of the content distribution network.

4. The system of claim 3, wherein after receiving the notification from the transaction processing edge server of the successful completion of the data transaction, the content edge server is further configured to:

respond to the request from the client indicating the successful completion of the data transaction, prior to the transaction processing edge server receiving a completion acknowledgement of the data transaction from the origin server.

5. The system of claim 1, wherein the one or more computing devices are further configured to:

determine that transaction processing is indicated for handling another request from the client or another client of the content distribution network;

based on a determination that transaction processing is indicated for handling the other request from the client:

select another open connection from the connection pool for communication with the transaction entity or another one of the one or more transaction entities;

execute, based on the other open connection, another data transaction with the transaction entity or the other transaction entity; and responsive to the other data transaction not being completed within a time threshold, cancel the other data transaction with the transaction entity or the other transaction entity.

6. The system of claim 1, wherein the one or more computing devices comprises a transaction processing edge server, wherein the open connection comprises a secure connection with the transaction entity, and wherein the transaction processing edge server is configured to:

negotiate the secure connection with the transaction entity, such that an origin site of the content distribution network is isolated from the negotiation of the secure connection.

7. The system of claim 6, wherein the secure connection is a transport layer security (TLS) connection.

8. A method, comprising:

performing, by one or more computing devices of a point of presence of a content distribution network:

maintaining, at the point of presence, a connection pool of one or more open connections with one or more transaction entities outside the content distribution network and distinct from an origin site of the content distribution network;

determining, by the one or more computing devices of the point of presence of the content distribution network, that transaction processing is indicated for handling a request from a remote client of the content distribution network based on one or more properties of the request from the remote client;

based on the determination, by the one or more computing devices of the point of presence of the content distribution network, that transaction processing is indicated for handling the request from the remote client of the content distribution network based on the one or more properties of the request from the remote client:

selecting an open connection from the connection pool maintained at the point of presence of the content distribution network for communication with one of the one or more transaction entities outside the content distribution network and distinct from an origin site of the content distribution network;

executing, based on the open connection, a data transaction with the transaction entity;

determining that the data transaction with the transaction entity has successfully completed; and responsive to the determination that the data transaction with the transaction entity has successfully completed, sending a notification to an endpoint.

9. The method of claim 8, wherein determining that the data transaction with transaction entity has successfully completed comprises:

determining that the data transaction successfully completed within a time threshold.

10. The method of claim 8, wherein sending the notification to the endpoint comprises:

notifying a content edge server of the content distribution network of the successful completion of the data transaction.

11. The method of claim 8, wherein sending the notification to the endpoint comprises:

sending a transaction success notification to an origin server of the content distribution network.

12. The method of claim 8, further comprising:

determining that transaction processing is indicated for handling another request from the client of the content distribution network;

based on a determination that transaction processing is indicated for handling the other request from the client:

selecting another open connection from the connection pool for communication with another one of the one or more transaction entities;

executing, based on the other open connection, another data transaction with the other transaction entity; and responsive to the other data transaction not being completed within a time threshold, cancelling the other data transaction with the other transaction entity.

13. The method of claim 8, wherein the request from the client comprises an indicator for transaction processing.

14. The method of claim 8, wherein the selected open connection is a transport layer security (TLS) connection.

15. One or more non-transitory computer-readable storage media storing program instructions, that when executed on or across one or more processors of a point of presence of a content distribution network, cause the one or more processors to:

maintain, at the point of presence, a connection pool of one or more open connections with one or more transaction entities outside the content distribution network and distinct from an origin site of the content distribution network;

determine, by the one or more processors of the point of presence of the content distribution network, that transaction processing is indicated for handling a request from a remote client of the content distribution network based on one or more properties of the request from the remote client;

based on the determination, by the one or more processors of the point of presence of the content distribution network, that transaction processing is indicated for handling the request from the remote client of the content distribution network based on the one or more properties of the request from the remote client:

select an open connection from the connection pool maintained at the point of presence of the content distribution network for communication with one of the one or more transaction entities outside the content distribution network and distinct from an origin site of the content distribution network;

execute, based on the open connection, a data transaction with the transaction entity;

determine that the data transaction with the transaction entity has successfully completed; and responsive to the determination that the data transaction with the transaction entity has successfully completed, send a notification to an endpoint.

16. The one or more non-transitory computer-readable storage media of claim 15, wherein to determine that the data transaction with transaction entity has successfully completed, the program instructions further cause the one or more processors to:

determine that the data transaction successfully completed within a time threshold.

17. The one or more non-transitory computer-readable storage media of claim 15, wherein the program instructions further cause the one or more processors to:

notify a content edge server of the content distribution network of the successful completion of the data transaction, or send a transaction success notification to an origin server of the content distribution network.

18. The one or more non-transitory computer-readable storage media of claim 15, wherein the program instructions further cause the one or more processors to:

determine that transaction processing is indicated for handling another request from the client or another client of the content distribution network;

based on a determination that transaction processing is indicated for handling the other request from the client:

select another open connection from the connection pool for communication with the transaction entity or another one of the one or more transaction entities;

execute, based on the other open connection, another data transaction with the transaction entity or the other transaction entity; and responsive to the other data transaction not being completed within a time threshold, cancel the other data transaction with the transaction entity or the other transaction entity.

19. The one or more non-transitory computer-readable storage media of claim 15, wherein the open connection comprises a secure connection with the transaction entity, and wherein the program instructions further cause the one or more processors to:

negotiate the secure connection with the transaction entity, such that an origin site of the content distribution network is isolated from the negotiation of the secure connection.

20. The one or more non-transitory computer-readable storage media of claim 19, wherein the secure connection is a transport layer security (TLS) connection.

* * * * *